United States Patent
Kanai et al.

(10) Patent No.: US 11,250,122 B2
(45) Date of Patent: Feb. 15, 2022

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Jun Kanai, Inagi (JP); Shinya Takumi, Kawasaki (JP); Yoshikazu Hanatani, Komae (JP); Naoki Ogura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 229 days.

(21) Appl. No.: 16/546,564

(22) Filed: Aug. 21, 2019

(65) Prior Publication Data
US 2020/0184067 A1  Jun. 11, 2020

(30) Foreign Application Priority Data
Dec. 10, 2018 (JP) .............................. JP2018-230789

(51) Int. Cl.
G06F 21/00 (2013.01)
G06F 21/51 (2013.01)
G06F 21/64 (2013.01)

(52) U.S. Cl.
CPC .............. *G06F 21/51* (2013.01); *G06F 21/64* (2013.01); *G06F 2221/033* (2013.01)

(58) Field of Classification Search
CPC ...... G06F 21/51; G06F 21/64; G06F 2221/033
See application file for complete search history.

(56) References Cited

U.S. PATENT DOCUMENTS

| | | | |
|---|---|---|---|
| 2012/0030731 A1 | 2/2012 | Bhargava et al. | |
| 2013/0055369 A1* | 2/2013 | Kumar | H04L 9/3247 726/7 |
| 2014/0082355 A1* | 3/2014 | Fanton | H04L 9/3239 713/165 |
| 2014/0082729 A1* | 3/2014 | Shim | G06F 21/562 726/23 |
| 2017/0026224 A1* | 1/2017 | Townsley | H04L 69/22 |
| 2018/0137285 A1 | 5/2018 | Yamada et al. | |
| 2019/0065735 A1 | 2/2019 | Ogura et al. | |

FOREIGN PATENT DOCUMENTS

| | | |
|---|---|---|
| JP | 2013-532869 A | 8/2013 |
| JP | 2014-170327 A | 9/2014 |
| JP | 2018-081577 A | 5/2018 |

* cited by examiner

*Primary Examiner* — Ghazal B Shehni
(74) *Attorney, Agent, or Firm* — Oblon, McClelland, Maier & Neustadt, L.L.P.

(57) ABSTRACT

According to an embodiment, an information processing apparatus includes one or more processors. The one or more processors are configured to acquire a program identifier of a computer program disposed on a memory and serving as an execution target; read a calculation result corresponding to the acquired program identifier from a storage; and verify whether the computer program serving as the execution target is permitted to be executed, on the basis of the read calculation result and a white list.

17 Claims, 16 Drawing Sheets

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-230789, filed on Dec. 10, 2018; the entire contents of which are incorporated herein by reference.

FIELD

Embodiments described herein relate generally to an information processing apparatus, an information processing method, and a computer program product.

BACKGROUND

A technique of preventing execution of an illegal program is known. For example, in a disclosed technique, a list of programs permitted to be executed and checksums of the programs are registered in a white list in advance, and a computer program serving as an execution target is verified using the white list.

In such a technique, a file disposed on a file system is verified on the basis of a path name or information provided to the file. This structure is not capable of verifying malware (file-less malware) having no actual form as a file and disposed to be executed in a memory of a main memory or the like.

DETAILED DESCRIPTION

According to an embodiment, an information processing apparatus includes one or more processors. The one or more processors are configured to acquire a program identifier of a computer program disposed on a memory and serving as an execution target; read a calculation result corresponding to the acquired program identifier from a storage; and verify whether the computer program serving as the execution target is permitted to be executed, on the basis of the read calculation result and a white list.

The following is a detailed explanation of an information processing apparatus, an information processing method, and a computer program product, with reference to the attached drawings.

First Embodiment

Figure 1:
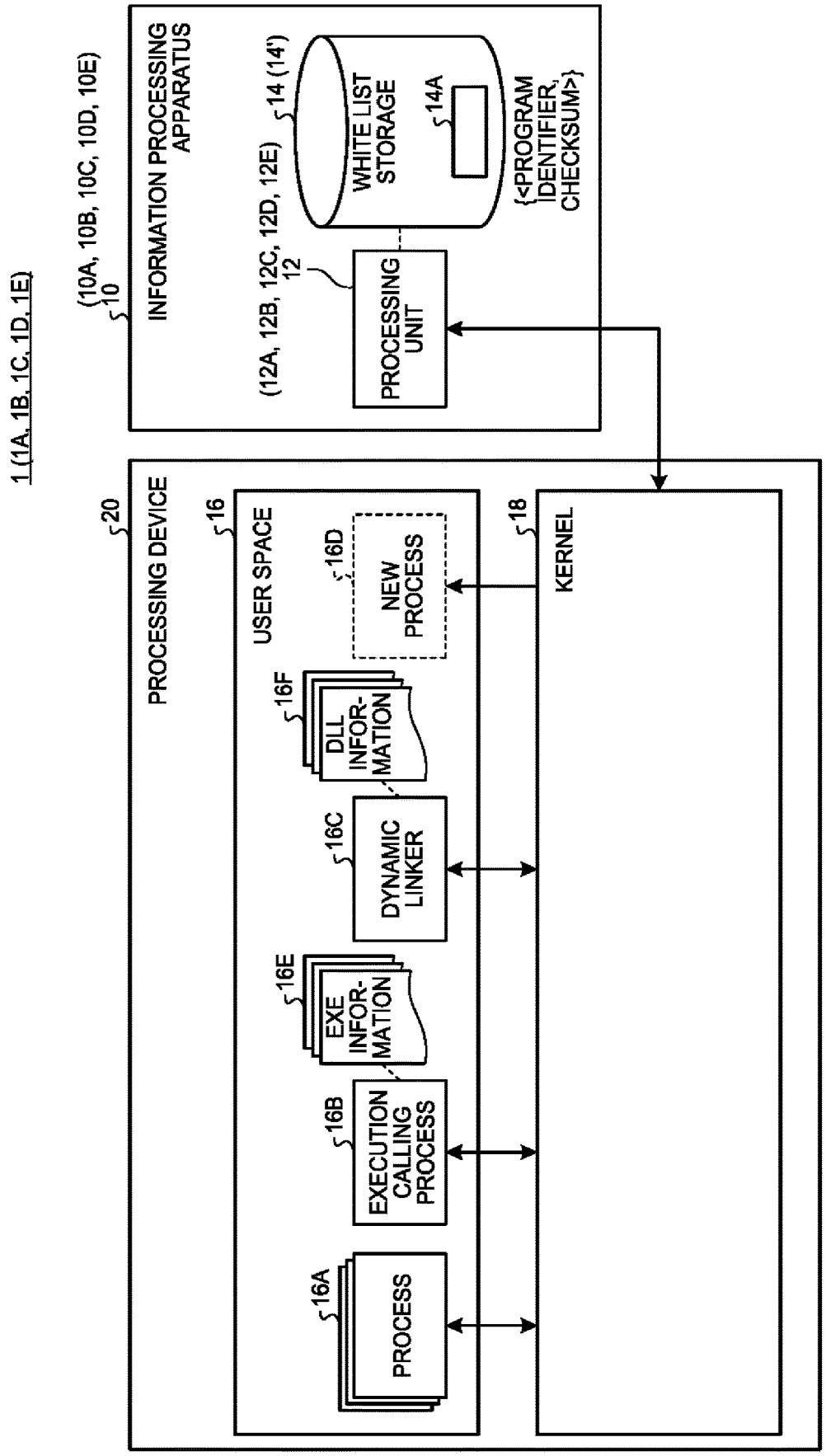
FIG. 1 is a schematic diagram illustrating an example of an information processing system.

FIG. 1 is a schematic diagram illustrating an example of an information processing system 1 according to the present embodiment.

The information processing system 1 includes an information processing apparatus 10 and a processing device 20. The information processing apparatus 10 and the processing device 20 are connected with each other through a wired line or wireless line such that they are capable of transmitting and receiving data and/or signals to and from each other.

The processing device 20 is an apparatus executing an application. The application is, for example, an application to achieve a specific task in an industrial system. In the present embodiment, the processing device 20 requests the information processing apparatus 10 to verify whether a computer program serving as a target (execution target) to be executed in the processing device 20 is permitted to be executed.

The information processing apparatus 10 verifies the program requested to be verified using a white list 14A.

The information processing apparatus 10 includes a processing unit 12 and a white list storage 14. The processing unit 12 and the white list storage 14 are connected with each other to be capable of transmitting and receiving data and/or signals to and from each other. The processing unit 12 executes program verification processing and the like (the details thereof will be described later). The white list storage 14 stores therein the white list 14A.

The white list 14A is a list associating program identifiers of programs serving as targets for which execution is allowed with checksums of the programs.

In the present embodiment, the programs include programs serving as targets executed in the processing device 20. In the present embodiment, computer programs are, for example, exe files serving as targets to be executed with the processing device 20, dynamic link libraries (DLL), and/or execution images (hereinafter referred to as memory execution images) disposed on a memory. The memory is, for example, a random access memory (RAM) used as a main memory.

The program identifiers are identifiers identifying the programs. The program identifiers are, for example, exe identifiers, dll identifiers, and/or memory execution image identifiers.

The exe identifiers are pieces of information identifying exe files. The form of the exe identifiers may be of any form, as long as the information processing apparatus 10 is capable of identifying the exe file. For example, the form of the exe identifiers is the same form as that of the program identifiers (exe identifiers herein) described in the white list 14A.

The dll identifiers are pieces of information identifying dll (dynamic link libraries). The form of the dll identifiers may be of any form, as long as the information processing apparatus 10 is capable of identifying the dll. For example, the form of the dll identifiers is the same form as that of the program identifiers (dll identifiers herein) described in the white list 14A.

The memory execution image identifiers are pieces of information identifying memory execution images. The form of the memory execution image identifiers may be of any form, as long as the information processing apparatus 10 is capable of identifying the memory execution images. For example, the form of the memory execution image identifiers is the same form as that of the program identifiers (memory execution image identifiers herein) described in the white list 14A.

Specifically, each of the program identifiers (exe identifiers and dll identifiers) is expressed with the name of the program, the path of the program, the identifier of the entry used in the system, and/or the address in the physical storage device. The identifier of the entry is, for example, an inode number of Linux (registered trademark). Each of the memory execution image identifiers is expressed with the address of the memory, information acquired by combining the address of the memory with the size, a unique number (for example, descriptor number in Linux and the like), and/or the region name of the memory. The checksums themselves may serve as identifiers, or the memory execution images themselves may serve as program identifiers. The region names of the memory are not necessarily unique. For example, all the memory execution images or a plurality of memory execution images may have the same program identifier, or memory execution image identifiers (such as the region name of the memory) may be empty characters.

The checksums are verification codes to verify the corresponding programs. Each of the checksums is always a fixed value, unless the corresponding program is changed. When the program is subjected to any change, a checksum indicating a different value is preferably used.

Each of the checksums is, for example, a hash value, an error detecting code, a file size, an access time, a digital signature, and a message authentication code (MAC). Each of the checksums may be, for example, a numerical value or a character string derived by applying any function to the corresponding program.

The hash value is obtained by applying a cryptographic hash function to the corresponding program. The cryptographic hash function is, for example, MD5, SHA-1, SHA-256, SHA-512, or SHA-3. The error detecting code is, for example, a cyclic redundancy code.

In the white list 14A, program identifiers of programs serving as targets for which execution is allowed and checksums of the programs are registered in association with each other. For example, program identifiers and checksums of all the programs to be executed in the processing device 20 are registered in advance in the white list 14A before the information processing apparatus 10 is started. The white list 14A may be updated with an external device or the like, while the information processing apparatus 10 is stopped.

In the case of using memory execution images, because empty characters are allowed as program identifiers, only checksums of computer programs may be registered in the white list 14A. In the case where only checksums are registered with empty characters used as program identifiers, verification is performed on the basis of whether the checksum is registered in the white list 14A. This is equivalent to using checksums themselves as identifiers.

In the present embodiment, the information processing apparatus 10 acquires the program identifier of the program serving as an execution target from the processing device 20, as a verification request for this program. Thereafter, the information processing apparatus 10 executes verification processing of the program identified with the acquired program identifier (the details thereof will be described later). The information processing apparatus 10 outputs a verification result to the processing device 20.

The processing device 20 includes a user space 16 and a kernel 18.

The kernel 18 is software forming the core of an Operating System (OS). The kernel 18 generates a process divided in units suitable for execution of the application, and manages resources (such as central processing unit (CPU), memory area, and access to an external device) necessary for operations in the process.

The user space 16 is a memory area used with the application operating on the OS. Specifically, the user space 16 is a memory area that the process is capable of accessing.

In the present embodiment, the kernel 18 performs processing necessary for executing the program serving as a target to be executed in the user space 16. In the present embodiment, the kernel 18 requests the information processing apparatus 10 to verify whether the program serving as an execution target is permitted to be executed.

The kernel 18 transmits the program identifier of the program serving as an execution target to the information processing apparatus 10, in accordance with a request from an execution calling process 16B or a dynamic linker 16C in the user space 16, to request the information processing apparatus 10 to verify the program.

Specifically, the execution calling process 16B newly starts execution of the program serving as execution target. By contrast, a process 16A executes processing by itself. The execution calling process 16B requests the kernel 18 to execute the exe file or the memory execution image serving as the execution target using exe information 16E.

The exe information 16E is information necessary for execution of an exe file or a memory execution image. The exe information 16E includes, for example, information to specify the exe file or the memory execution image, a list of arguments to change the behavior of the exe file or the memory execution image, and details of the environment variable, and the like. The information to specify the exe file is, for example, a file path of the exe file and the like. The information to specify the memory execution image is, for example, an address on the memory in which the memory execution image is disposed, size information indicating the size of the memory execution image, and an identifier assigned by the kernel to the memory in which the memory execution image is disposed. The identifier may be a unique number or a character string, such as a name.

The kernel 18 outputs a request to verify the exe file or the memory execution image serving as the execution target to the information processing apparatus 10. When the received verification result indicates "permitted", the kernel 18 generates a new process 16D corresponding to the exe file or the memory execution image serving as an execution target.

The dynamic linker 16C is one of processes in the user space 16. Execution of the application with the new process 16D may require execution of a function in the dynamic link library. In such a case, the dynamic linker 16C executes processing necessary for reading the dynamic link library with the new process 16D. Specifically, the dynamic linker 16C requests the kernel 18 to read the dynamic link library, using dll information 16F.

The dll information 16F is information necessary for reading the dynamic link library onto the area on a memory to which the new process 16D is capable of referring. The dll information 16F includes, for example, a virtual address accessible in the user space 16, and information for specifying the dynamic link library. When the virtual address to be accessed is determined in advance, the dll information 16F includes no virtual address.

When the kernel 18 receives a request from the dynamic linker 16C, the kernel 18 requests the information processing apparatus 10 to verify whether reading of the dynamic link library is permitted to be executed. When the verification result received from the information processing apparatus 10 indicates "permitted", the kernel 18 executes processing necessary for reading the dynamic link library.

The present embodiment illustrates the form in which the processing device 20 and the information processing apparatus 10 are formed as separate elements. However, the processing device 20 and the information processing apparatus 10 may be formed as a unitary element. For example, the processing device 20 and the information processing apparatus 10 may be executed on the same hardware. As another example, the information processing apparatus 10 may exist as one of the processes 16A executed in the processing device 20. As another example, the information processing apparatus 10 may exist as part of the function of the kernel 18.

Figure 2:
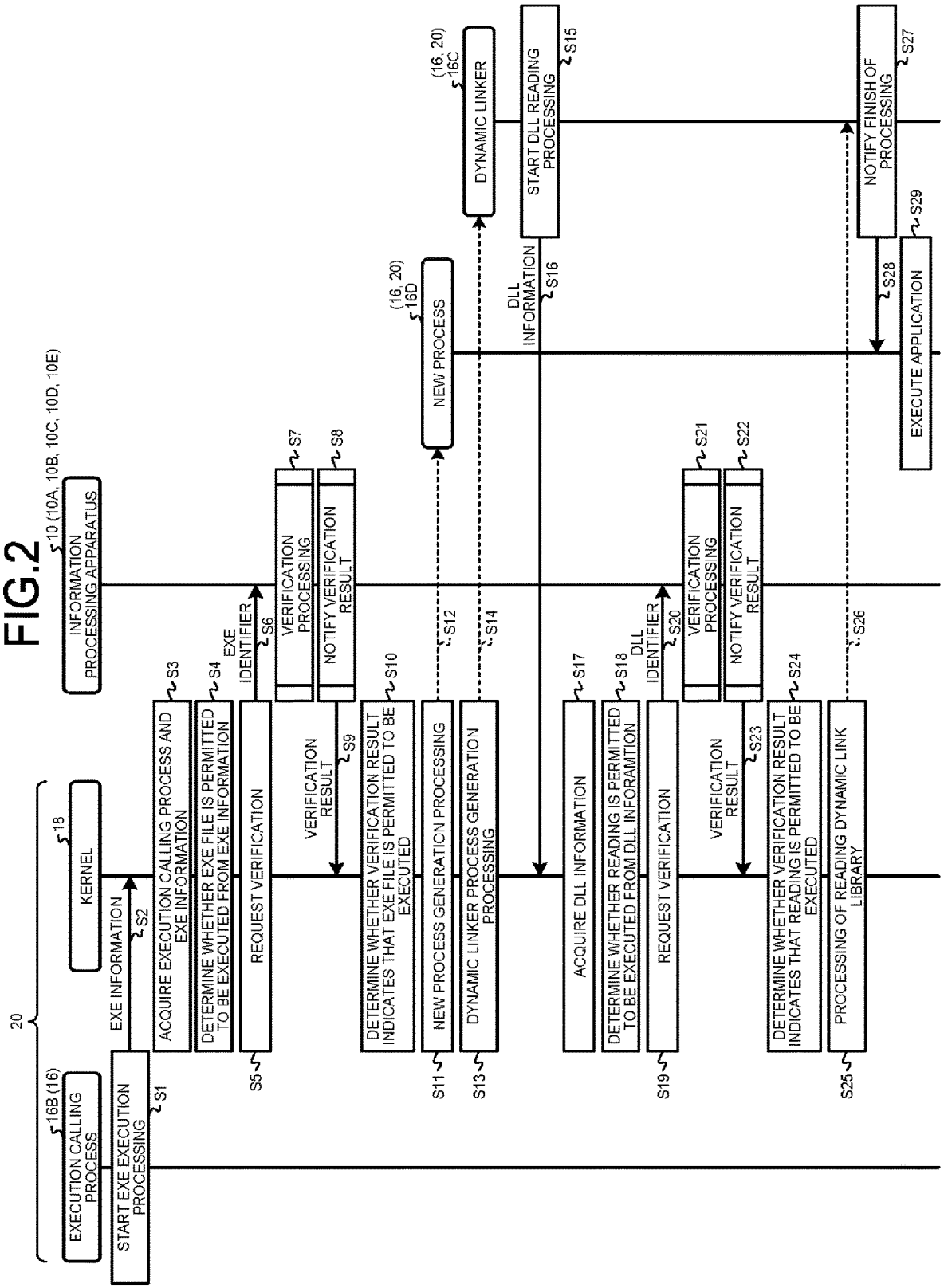
FIG. 2 is a sequence diagram illustrating a flow of processing executed with the information processing system.

The following is an explanation of a flow of processing executed with the information processing system 1. FIG. 2 is a sequence diagram illustrating an example of a flow of the processing executed with the information processing system 1. FIG. 2 illustrates the case of executing an exe file, but the same process may be applied to the case of executing a memory execution image. In such a case, the term "exe file" may be replaced with the term "memory execution image", and the term "exe identifier" may be replaced with the term "memory execution image identifier".

First, the execution calling process 16B starts processing to execute the exe file, as the program serving as an execution target (Step S1). The execution calling process 16B notifies the kernel 18 of the exe information 16E of the exe file (Step S2).

The kernel 18 acquires the exe information 16E, and acquires information of the execution calling process 16B serving as the transmission source of the exe information 16E (Step S3).

The information of the execution calling process 16B is, for example, user information of the user who has instructed execution of the execution calling process 16B, user information of the user who is capable of accessing the exe file serving as an execution target, information relating to the exe file serving as an execution target, the file form of the exe file serving as an execution target, and the file path name of the dynamic linker 16C described in the exe file serving as an execution target.

The kernel 18 determines whether the exe file specified with the exe information 16E acquired at Step S2 is permitted to be executed (Step S4). For example, the kernel 18 determines whether the execution calling process 16B serving as a transmission source of the exe information 16E possesses authority to execute the exe file. The determination is performed using, for example, user information of the user who is capable of accessing the exe file serving as an execution target.

When it is determined at Step S4 that the exe file is permitted to be executed, the processing proceeds to Step S5. When it is determined at Step S4 that the exe file is not permitted to be executed, the kernel 18 outputs a verification result indicating that the exe file is not permitted to be executed to the execution calling process 16B, and ends the sequence.

At Step S5, the kernel 18 transmits a request to verify the exe file specified with the exe information 16E acquired at Step S2 to the information processing apparatus 10 (Step S5). Specifically, the kernel 18 transmits the exe identifier of the exe file serving as the program to be executed to the information processing apparatus 10 (Step S6).

By the processing at Step S6, the information processing apparatus 10 acquires the exe identifier, as the program identifier of the program serving as an execution target. The information processing apparatus 10 executes verification processing (Step S7) using the white list 14A, for the exe file identified with the exe identifier acquired at Step S6. Thereafter, the information processing apparatus 10 outputs a verification result to the kernel 18 (Step Sb). The details of Step S7 and Step S8 will be described later.

The kernel 18 acquires the verification result from the information processing apparatus 10 (Step S9). The kernel 18 determines whether the verification result acquired at Step S9 indicates that the exe file serving as an execution target is permitted to be executed (Step S10).

When it is determined that the verification result indicates that the exe file is permitted to be executed at Step S10, the processing proceeds to Step S11. When it is determined that the verification result indicates that the exe file is not permitted to be executed at Step S10, the kernel 18 outputs a verification result indicating that the exe file is not permitted to be executed to the execution calling process 16B, and ends the sequence.

At Step S11, the kernel 18 generates a new process 16D (Step S11 and Step S12). The new process 16D is a new process corresponding to the exe file specified with the exe information 16E received at Step S1.

Thereafter, the kernel 18 generates a process of the dynamic linker 16C (Step S13 and Step S14). The dynamic linker 16C starts processing of reading the dynamic link library necessary for executing the application of the new process 16D, and notifies the dll information 16F to the kernel 18 (Step S15 and Step S16).

On receipt of the request of the dynamic linker 16C, the kernel 18 acquires information of the dynamic linker 16C and the dll information 16F (Step S17).

The kernel 18 determines, using the acquired dll information 16F, whether the dynamic link library is readable (Step S18). For example, the kernel 18 determines, using the user information, whether the execution calling process 16B serving as a transmission source of the exe information at Step S2 possesses authority to read the dynamic link library. When it is determined at Step S18 that the dynamic link library is not readable, the sequence is ended. By contrast, when it is determined at Step S18 that the dynamic link library is readable, the processing proceeds to Step S19.

At Step S19, the kernel 18 transmits a request to verify the dynamic link library specified with the dll information 16F acquired at Step S17 to the information processing apparatus 10 (Step S20). Specifically, the kernel 18 transmits the dll identifier of the dynamic link library serving as a computer program to be executed to the information processing apparatus 10 (Step S20).

By the processing at Step S20, the information processing apparatus 10 acquires the dll identifier, as a computer program identifier of the program serving as an execution target. The information processing apparatus 10 executes verification processing (Step S21) using the white list 14A, for the dll (dynamic link library) identified with the acquired dll identifier. Thereafter, the information processing apparatus 10 outputs the verification result to the kernel 18 (Step S22). The details of the processing at Step S21 and Step S22 will be described later.

The kernel 18 acquires the verification result from the information processing apparatus 10 (Step S23). The kernel 18 determines whether the verification result acquired at Step S23 indicates that reading of the dynamic link library serving as an execution target is permitted to be executed (Step S24).

When it is determined at Step S24 that the verification result indicates that reading is permitted to be executed, the processing proceeds to Step S25. When it is determined at Step S24 that the verification result indicates that reading is not permitted to be executed, the kernel 18 outputs a verification result indicating that reading is not permitted to be executed to the execution calling process 16B, and ends the sequence.

At Step S25, the kernel 18 executes processing of reading the dynamic link library verified as permitted to be executed (Step S25). Specifically, the kernel 18 loads the contents of the dynamic link library on the memory, and notifies the dynamic linker 16C that the processing has been finished (Step S26).

When the dynamic linker 16C receives a notification that the processing has been finished, the dynamic linker 16C notifies the new process 16D that reading of the dynamic link library has been finished (Step S27 and Step S28). The new process 16D starts execution of predetermined application (Step S29). Thereafter, the sequence is ended.

The flow of the processing executed with the information processing system 1 when the new process 16D is executed is not limited to the flow described above.

For example, in the sequence illustrated in FIG. 2, the kernel 18 determines whether the exe file is permitted to be executed, and determines whether reading of the dynamic link library is permitted to be executed (Step S4 and Step S18), before the kernel 18 requests the information processing apparatus 10 to perform verification (Step S5 and Step S19).

However, the kernel 18 may determine whether the exe file is permitted to be executed and determine whether reading of the dynamic link library is permitted to be executed (Step S4 and Step S18) together with determination based on the verification result (Step S10 and Step S24).

In the sequence illustrated in FIG. 2, the kernel 18 calls the dynamic linker 16C (Step S14). However, the kernel 18 or the new process 16D may directly execute the processing of reading the dynamic link library.

In the sequence described above, execution of the exe file and reading of the dynamic link library serve as execution targets. However, the operation for the program is not limited to execution or reading.

For example, examples of the operation for the program include preparation of a new program, rewrite of the program, transfer of the position on the program path, copy of the program, change of the program file name, and write/read to and from the external device. The external device is, for example, an external storage device, such as a USB stick, or a network interface device (NIC).

When these operations are executed, the kernel 18 of the processing device 20 may transmit the identifier of the program serving as an operation target, as the program identifier of the program serving as an execution target, to the information processing apparatus 10. In this manner, the processing device 20 may request the information processing apparatus 10 to verify the program serving as an operation target.

As illustrated in FIG. 2, when the exe file reads the dynamic link library in execution of the new process 16D, verification is required as to whether reading of the dynamic link library is permitted to be executed, in addition to verification as to whether the exe file is permitted to be executed. In addition, there are cases where one exe file serving as an execution target reads a plurality of dynamic link libraries, or calls a plurality of other exe files serving as execution targets. For this reason, when one new process 16D is executed, verification may be required for a plurality of programs (exe files or dynamic link libraries). In such a case, when the information processing apparatus 10 calculates a checksum and executes verification one by one, verification of the program using the white list storage 14 may require much time.

For this reason, the information processing apparatus 10 according to the present embodiment executes peculiar information processing.

Figure 3:
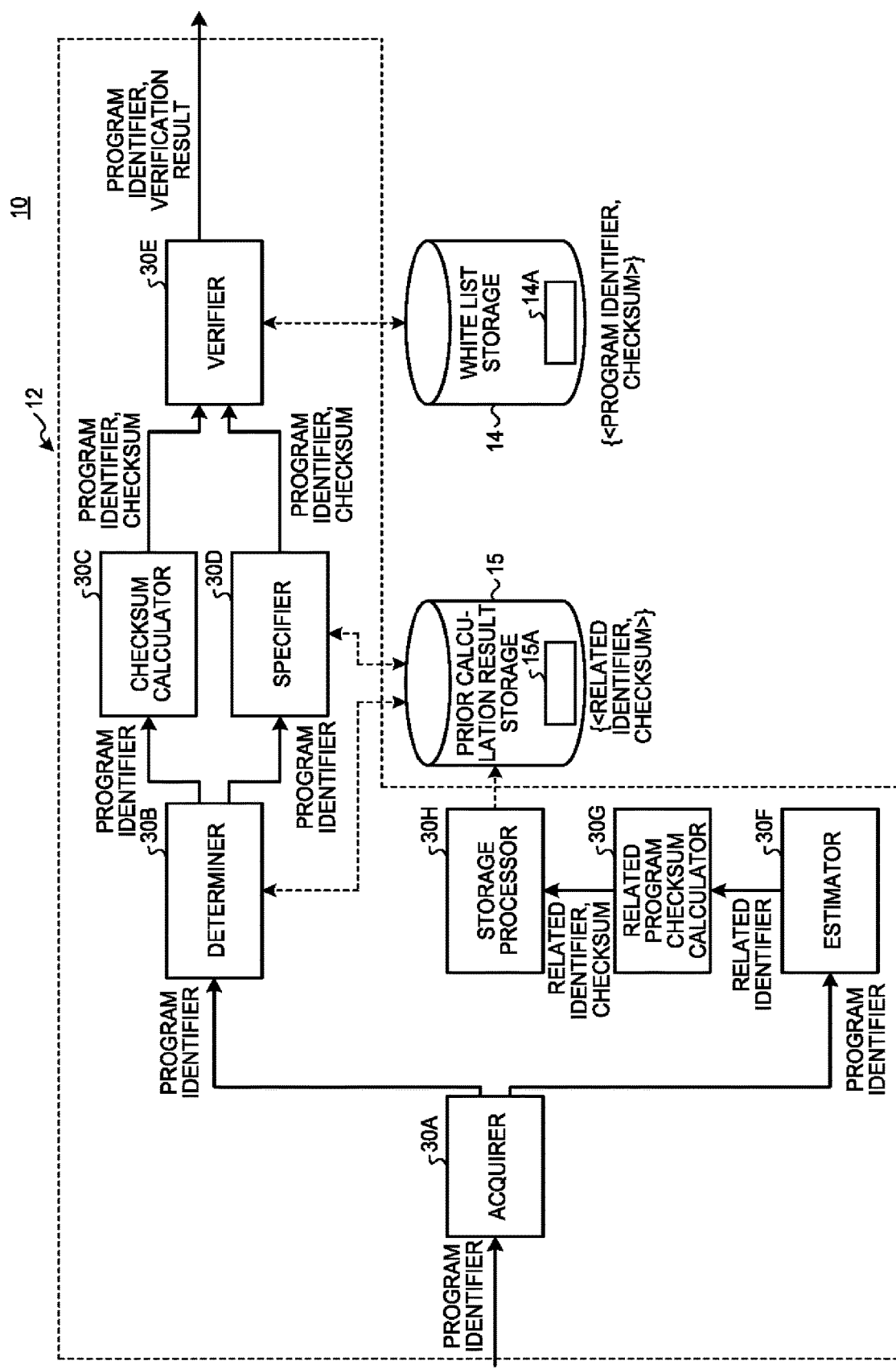
FIG. 3 is a block diagram illustrating a functional configuration of an information processing apparatus.

The following is an explanation of a functional configuration of the information processing apparatus 10. FIG. 3 is a block diagram illustrating an example of the functional configuration of the information processing apparatus 10.

The information processing apparatus 10 includes the processing unit 12, the white list storage 14, and a prior calculation result storage 15. The processing unit 12, the white list storage 14, and the prior calculation result storage 15 are connected with each other such that they are capable of transmitting and receiving data and/or signals to and from each other.

The processing unit 12 includes an acquirer 30A, a determiner 30B, a checksum calculator 30C, a specifier 30D, a verifier 30E, an estimator 30F, a related program checksum calculator 30G, and a storage processor 30H.

Each of the units (the acquirer 30A, the determiner 30B, the checksum calculator 30C, the specifier 30D, the verifier 30E, the estimator 30F, the related program checksum calculator 30G, and the storage processor 30H) described above is achieved with, for example, one or a plurality of processors.

For example, each of the units described above may be achieved by causing a processor, such as a central processing unit (CPU), to execute a computer program, that is, with software. Each of the units described above may be achieved with a processor, such as a dedicated integrated circuit (IC), that is, hardware. Each of the units may be achieved with software and hardware used together. In the case of using a plurality of processors, each of the processors may achieve one of the units or two or more of the units.

The acquirer 30A acquires the program identifier for identifying the program serving as an execution target. As described above, the computer program to be executed is an exe file, a memory execution image, and a dynamic link library, or the like. The program identifier is, for example, an exe identifier, a memory execution image identifier, and a dll identifier, or the like, as described above.

Specifically, the acquirer 30A acquires the program identifier for identifying the program serving as an execution target, as a verification request, from the processing device 20. The acquirer 30A outputs the acquired program identifier to the determiner 30B and the estimator 30F.

The determiner 30B determines whether calculation of a checksum is required for the program identified with the program identifier acquired with the acquirer 30A. The determiner 30B performs determination using a prior calculation result list 15A stored in the prior calculation result storage 15.

The prior calculation result storage 15 stores therein the prior calculation result list 15A. The prior calculation result list 15A is a list associating related identifiers identifying related programs with calculation results for the related programs.

Each of the related programs is another program related to the program identified with the specific program identifier, in the white list 14A. In the following explanation, the program identified with the specific program identifier may be simply referred to as "specific program".

For example, each of the related programs is another program stored in the same storage area as that of the specific program. The same storage area is, for example, the same directory. The related program may be a computer program placed only on a memory, not the same storage area as that of the specific program. Each of the related programs is another program that may be executed together when the specific program is executed. Each of the related programs is another program executed with the application executing the specific program.

The specific program identifier may be any program identifier in the program identifiers registered in the white list 14A. For example, the specific program identifier is a computer program identifier acquired with the acquirer 30A, in the white list 14A. As another example, the specific program identifier is the program identifier acquired previously with the acquirer 30A, in the white list 14A.

The word "previously" means "directly before". Specifically, the specific program identifier may be the program identifier acquired directly before with the acquirer 30A, in the white list 14A.

As another example, the specific program identifier is the program identifier of the program verified previously (directly before) with the verifier 30E described later, in the white list 14A. As another example, the specific program identifier is the program identifier of the program verified previously (directly before) with the verifier 30E, and for which a verification result indicating that the program is permitted to be executed has been derived, in the white list 14A.

The specific program identifier is not limited to the program identifier of the program verified or acquired previously (directly before), in the white list 14A. Specifically, the specific program identifier may be any of the program identifiers verified with the verifier 30E in the past, or acquired with the acquirer 30A in the past, in the white list 14A.

The present embodiment illustrates the case where the specific program identifier is the program identifier acquired directly before with the acquirer 30A, and the program identifier of the program verified directly before with the verifier 30E, as an example.

The calculation result for the related program is a value obtained by performing any calculation processing on the related program. For example, the calculation result for the related program is at least one of a checksum of the related program, and an index indicating the registration position of the program identifier indicating the related identifier in the white list 14A.

The expression "program identifier indicating the related identifier" or "related identifier indicating the program identifier" means that the related identifier and the program identifier have the same value (identifier).

The present embodiment illustrates the case where the calculation result for the related program is a checksum of the related program, as an example. For this reason, the present embodiment illustrates the case where the prior calculation result list 15A is a list associating the related identifiers with the checksums.

The related identifiers and the calculation results (checksums) of the related programs are calculated in advance with the estimator 30F and the related program checksum calculator 30G described later, and registered in the prior calculation result storage 15. The prior calculation result list 15A is updated with the estimator 30F, the related program checksum calculator 30G, and the storage processor 30H described later.

The determiner 30B determines whether the related identifier indicating the program identifier acquired with the acquirer 30A and the checksum corresponding to the related identifier are registered in the prior calculation result list 15A. By the determination, the determiner 30B determines whether calculation of the checksum is required.

When the determiner 30B determines that calculation of the checksum is required, the determiner 30B outputs the program identifier received from the acquirer 30A to the checksum calculator 30C. When the checksum calculator 30C receives the program identifier from the determiner 30B, the checksum calculator 30C calculates a checksum of the program identified with the received program identifier.

For example, the checksum calculator 30C acquires a file path of the program identified with the received program identifier. Thereafter, the checksum calculator 30C executes, using the acquired file path, a command to open the program identified with the program identifier. In this manner, the checksum calculator 30C acquires the details of the program as a binary character string. The checksum calculator 30C calculates a checksum by inputting the binary character string to a cryptographic hash function.

For example, the program file or the binary character string of the program file may be acquired from an external device (for example, the processing device 20) that is not located on the information processing apparatus 10. In this case, the checksum calculator 30C may have a function to transmit the received program identifier to the external device, and receive the program or the binary character string retrieved in the external device.

The binary character string used for calculation of the checksum may include information other than the details of the program. For example, the binary character string may include meta-information of the program identified with the received program identifier. The meta-information is, for example, a file size, access authority, and a time stamp.

The checksum calculator 30C outputs the program identifier received from the determiner 30B, and the calculated checksum, to the verifier 30E.

By contrast, when the determiner 30B determines that calculation of the checksum is not required, the determiner 30B outputs the program identifier received from the acquirer 30A to the specifier 30D.

The specifier 30D reads the checksum corresponding to the related identifier indicating the program identifier received from the determiner 30B, from the prior calculation result list 15A. In this manner, the specifier 30D specifies the checksum corresponding to the received program identifier. The specifier 30D outputs the program identifier received from the determiner 30B and the specified checksum to the verifier 30E.

The verifier 30E verifies whether the program serving as an execution target is permitted to be executed, on the basis of the acquired program identifier, the calculation result corresponding to the related identifier indicating the acquired program identifier in the prior calculation result list 15A, and the white list 14A.

As described above, the present embodiment illustrates the case where the calculation result is the checksum of the related program. For this reason, when the checksum corresponding to the related identifier indicating the acquired program identifier in the prior calculation result list 15A and the acquired program identifier are registered in the white list 14A in association with each other, the verifier 30E derives a verification result indicating that the program serving as an execution target is permitted to be executed.

Specifically, the verifier 30E receives the program identifier and the checksum from the checksum calculator 30C or the specifier 30D.

When the received program identifier and the checksum are registered in the white list 14A in association with each other, the verifier 30E derives a verification result indicating that the program is permitted to be executed. More specifically, the verifier 30E derives a verification result indicating that the program is permitted to be executed, when the checksum received from the specifier 30D or the checksum calculator 30C agrees with the checksum corresponding to the program identifier acquired with the acquirer 30A in the white list 14A.

By contrast, when the program identifier acquired with the acquirer 30A is not registered in the white list 14A, the verifier 30E derives a verification result indicating that the program is not permitted to be executed. The verifier 30E also derives a verification result indicating that the program is not permitted to be executed, when the checksum received from the specifier 30D or the checksum calculator 30C does not agree with the checksum corresponding to the program identifier acquired with the acquirer 30A in the white list 14A.

As described above, when the related identifier indicating the program identifier acquired with the acquirer 30A is registered in the prior calculation result list 15A, the verifier 30E derives a verification result, by comparing the checksum specified from the prior calculation result list 15A with the checksum corresponding to the program identifier in the white list 14A. This structure enables the information processing apparatus 10 to reduce the time for calculating the checksum.

By contrast, the estimator 30F estimates a related program related to the program identified with the specific program identifier. Specifically, the estimator 30F estimates a related program related to the specific program identifier assumed to be registered in the white list 14A. The definitions of the specific program identifier and the related program have been described above, and are not described herein.

For example, the estimator 30F estimates a related program related to the program identified with the program identifier acquired with the acquirer 30A.

In the present embodiment, the estimator 30F executes processing of estimating the related identifier, after the verifier 30E executes verification based on the program identifier acquired with the acquirer 30A.

For this reason, in the present embodiment, the estimator 30F estimates a related program related to the program identified with the program identifier received from the acquirer 30A using the program identifier, after verification processing with the verifier 30E is finished.

In this manner, the estimator 30F estimates a related program related to the program verified previously (directly before) with the verifier 30E, in the white list 14A.

The estimator 30F may estimate a related program related to the verified program, only when the verification result obtained with the verifier 30E indicates that the program is permitted to be executed.

The method for estimating a related program with the estimator 30F is not limited. For example, the estimator 30F acquires a file path of the program identified with the program identifier acquired with the acquirer 30A from the program identifier. The estimator 30F specifies another program retained in a place (for example, a directory) indicated with the file path, as related program. In this manner, the estimator 30F estimates a related program.

As another example, the estimator 30F acquires a computer program identified with the program identifier acquired with the acquirer 30A from the program identifier. The estimator 30F analyzes the details of the program, and specifies a computer program executed or read with the program, as a related program.

The estimator 30F may estimate one or a plurality of related programs for one program identifier. For this reason, the number of related programs estimated with the estimator 30F is not limited to one.

The estimator 30F outputs the related identifier of the estimated related program to the related program checksum calculator 30G.

The related program checksum calculator 30G calculates a checksum of the related program identified with the received related identifier. For example, the related program checksum calculator 30G acquires a file path of the related program using the received related identifier. Thereafter, the related program checksum calculator 30G executes, using the acquired file path, a command to open the related program identified with the related identifier. In this manner, the related program checksum calculator 30G acquires the details of the related program as a binary character string. The related program checksum calculator 30G inputs the binary character string to the cryptographic hash function, to calculate the checksum.

The binary character string used for calculation of the checksum may include information other than the details of the program. For example, the binary character string may include meta-information of the related program identified with the received related identifier. The meta-information is, for example, a file size, access authority, and a time stamp.

The related program checksum calculator 30G outputs the related identifier, and the checksum of the related program identified with the related identifier to the storage processor 30H.

The storage processor 30H associates the calculation result for the related program with the related identifier for identifying the related program, and registers them in the prior calculation result list 15A.

In the present embodiment, the storage processor 30H associates the related identifier and the checksum received from the related program checksum calculator 30G, and registers them in the prior calculation result list 15A.

For this reason, the prior calculation result list 15A is updated with the estimator 30F, the related program checksum calculator 30G, and the storage processor 30H. Specifically, the prior calculation result list 15A registers the related identifiers of the related programs related to the program identified with the specific program identifier, among the program identifiers registered in the white list 14A, and the checksums of the related programs, in association with each other.

For this reason, when the acquirer 30A acquires a new program identifier, the related identifier indicating the program identifier and the checksum have already been registered in the prior calculation result list 15A with high probability. This is because the estimator 30F estimates in advance a related program related to the specific program, and the related identifier of the related program and the checksum calculated in advance are associated with each other and registered in the prior calculation result list 15A.

Accordingly, when the related identifier indicating the program identifier newly acquired with the acquirer 30A and the checksum thereof have already been registered in the prior calculation result list 15A in association with each other, the processing unit 12 is enabled to shorten the time for calculating the checksum. With this structure, the information processing apparatus 10 according to the present embodiment is enabled to shorten the verification time.

Figure 4:
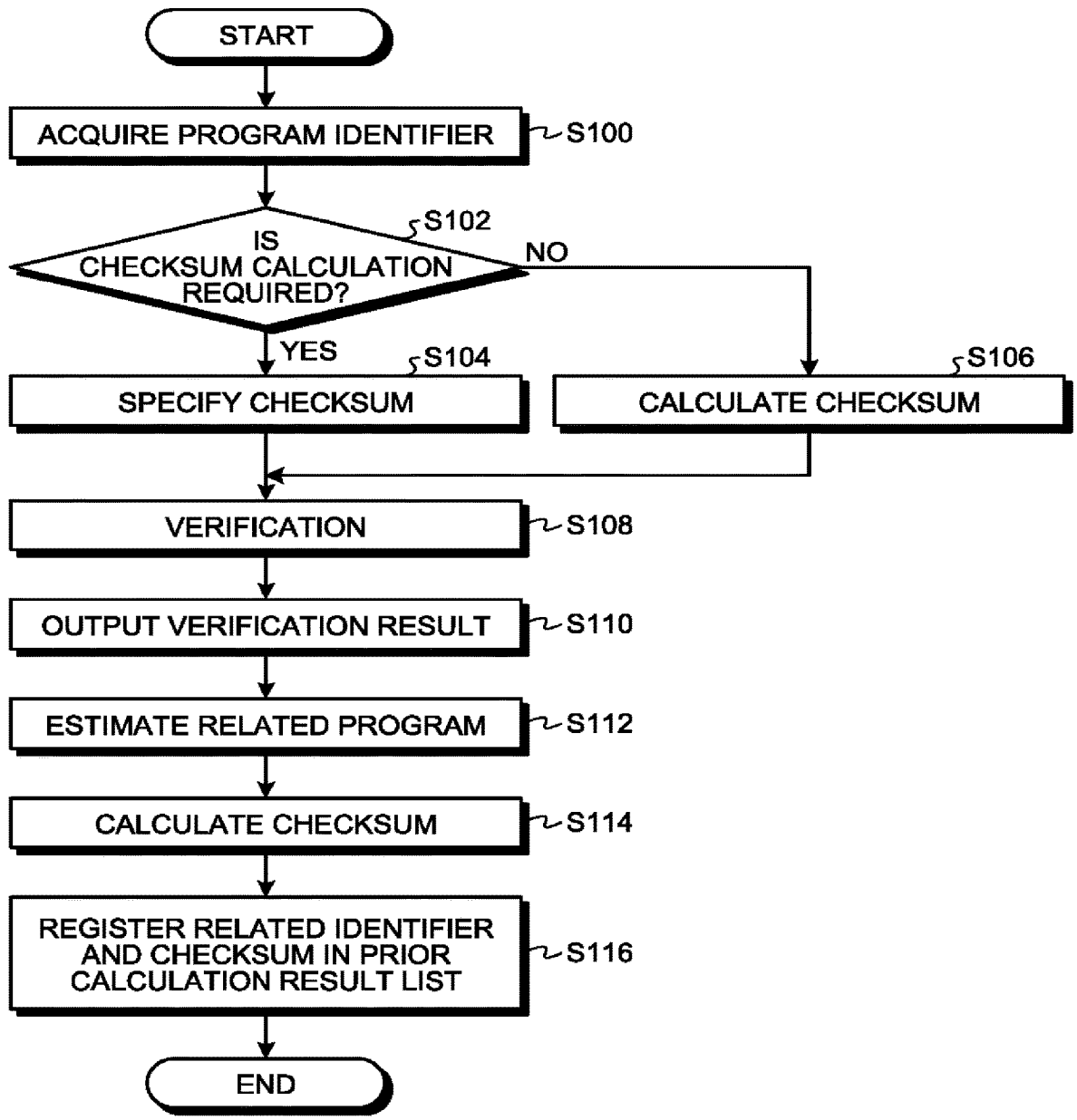
FIG. 4 is a flowchart illustrating a process of information processing.

The following is an explanation of an example of a process of information processing executed with the information processing apparatus 10 according to the present embodiment. FIG. 4 is a flowchart illustrating an example of the process of information processing executed with the information processing apparatus 10 according to the present embodiment. The flowchart illustrated in FIG. 4 is an example of a detailed explanation of the processing at Step S7 and Step S8 and the processing at Step S21 and Step S22 illustrated in FIG. 2.

First, the acquirer 30A acquires a computer program identifier for identifying the program serving as an execution target (Step S100).

Thereafter, the determiner 30B determines whether calculation of a checksum is required, for the program identified with the program identifier acquired at Step S100 (Step S102). The determiner 30B executes determination using the prior calculation result list 15A stored in the prior calculation result storage 15. When the determination at Step S102 is negative (No at Step S102), the process proceeds to Step S104.

At Step S104, the specifier 30D reads the checksum corresponding to the related identifier indicating the program identifier acquired at Step S100, from the prior calculation result list 15A. In this manner, the specifier 30D specifies the checksum corresponding to the received program identifier (Step S104). Thereafter, the process proceeds to Step S108.

By contrast, when the determination at Step S102 is affirmative (Yes at Step S102), the process proceeds to Step S106. At Step S106, the checksum calculator 30C calculates the checksum of the program identified with the program identifier acquired at Step S100 (Step S106). Thereafter, the process proceeds to Step S108.

At Step S108, the verifier 30E verifies whether the program identified with the program identifier is permitted to be executed (Step S108), using the checksum specified at Step S104 or calculated at Step S106, the program identifier acquired at Step S100, and the white list 14A. The verifier 30E outputs a verification result indicating that the program is permitted to be executed or not permitted to be executed to the processing device 20 (Step S110).

Thereafter, the estimator 30F estimates a related program related to the program identified with the program identifier acquired at Step S100 (Step S112).

Thereafter, the related program checksum calculator 30G calculates a checksum of the related program estimated at Step S112 (Step S114). Thereafter, the storage processor 30H associates the related identifier of the related program estimated at Step S112 with the checksum calculated for the related program at Step S114, and registers them in the prior calculation result list 15A (Step S116). Thereafter, the present routine is finished.

As explained above, the information processing apparatus 10 according to the present embodiment includes the estimator 30F, the storage processor 30H, the acquirer 30A, and the verifier 30E. The estimator 30F estimates a related program related to the program identified with the specific program identifier. The storage processor 30H associates the calculation result for the related program with the related identifier for identifying the related program, and registers them in the prior calculation result list 15A. The acquirer 30A acquires the program identifier for identifying the program serving as an execution target. The verifier 30E verifies whether the program serving as an execution target is permitted to be executed, on the basis of the acquired program identifier and the calculation result corresponding to the related identifier indicating the acquired program identifier in the prior calculation result list 15A, and the white list 14A.

As described above, in the information processing apparatus 10 according to the present embodiment, the related identifier of the estimated related program and the calculation result thereof are associated with each other, and registered in the prior calculation result list 15A. With this structure, the verifier 30E is enabled to shorten the time for verifying the program using the white list 14A, by performing verification using the acquired program identifier, the calculation result corresponding to the related identifier indicating the acquired program identifier in the prior calculation result list 15A, and the white list 14A.

Accordingly, the information processing apparatus 10 according to the present embodiment is enabled to shorten the time for verifying the program using the white list 14A.

The information processing apparatus 10 according to the present embodiment is also capable of verifying computer programs (memory execution images) having no actual form as a file and disposed to be executed on a memory, such as a main memory. Because only memory execution images of executable computer programs are registered in the white list, even when illegal computer programs, such as file-less malware, serve as execution targets, this structure is capable of verifying that the illegal computer program is not permitted to be executed. Specifically, this structure enables more accurate verification using a white list.

Modification

The first embodiment described above illustrates the form in which the estimator 30F estimates a related program from the program identified with the program acquired with the acquirer 30A.

However, the method for estimating a related program with the estimator 30F is not limited to the method illustrated in the first embodiment. For example, the estimator 30F may estimate a related program using a list (related program list) generated in advance and related to related programs.

In the present modification, the same structures and the same functions as those in the embodiment described above are denoted with the same reference numerals, and a detailed explanation thereof is omitted. In the present modification, the same words are used for terms indicating the same definitions as those in the embodiment described above, and a detailed explanation thereof is omitted.

FIG. 1 is a schematic diagram illustrating an example of an information processing system 1A according to the present modification.

The information processing system 1A includes an information processing apparatus 10A and the processing device 20. The information processing apparatus 10A and the processing device 20 are connected with each other through a wired line or wireless line such that they are capable of transmitting and receiving data and/or signals to and from each other. The processing device 20 is the same as that in the first embodiment. The information processing apparatus 10A includes a processing unit 12A and the white list storage 14.

Figure 5:
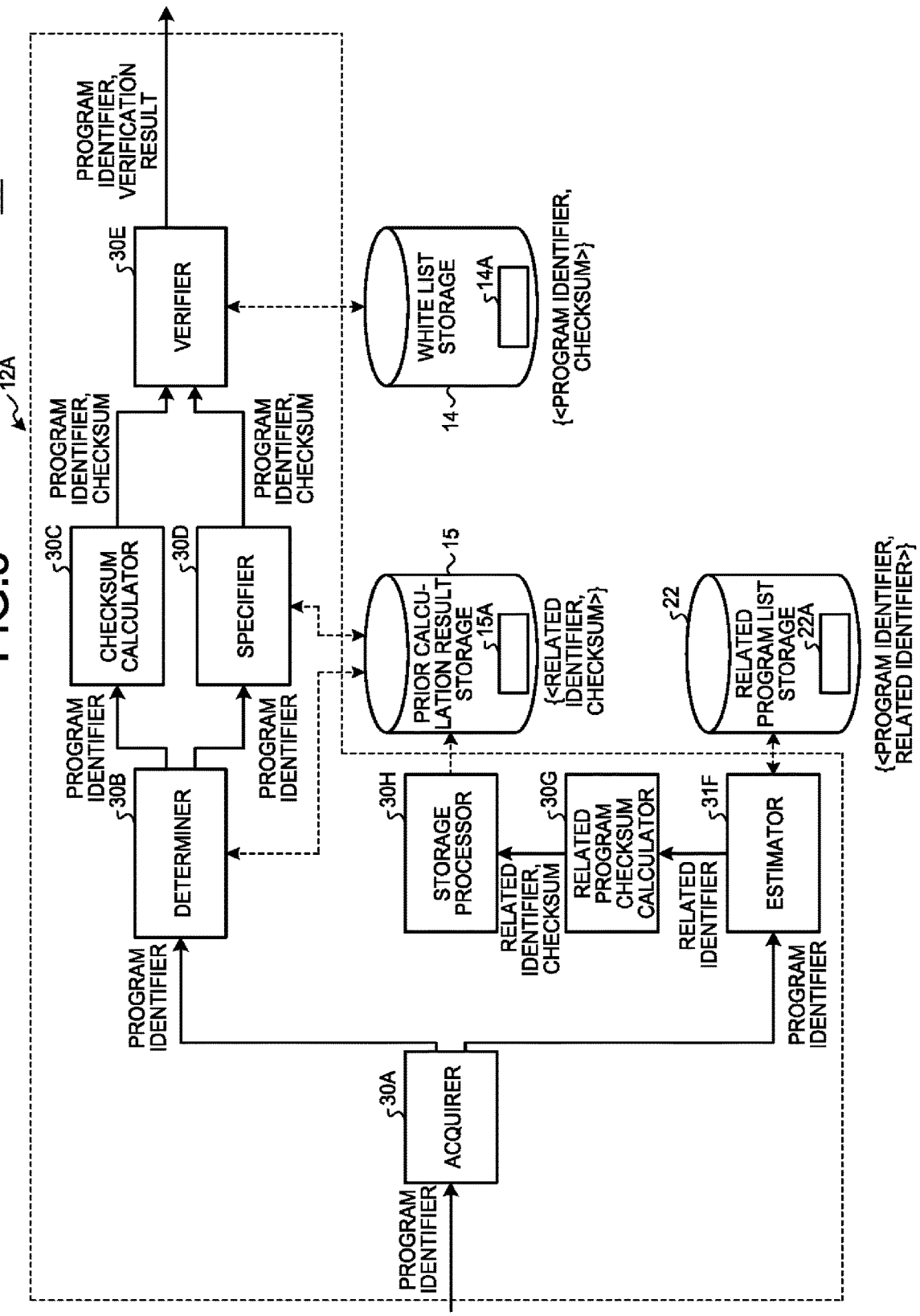
FIG. 5 is a block diagram illustrating a functional configuration of the information processing apparatus.

The following is an explanation of the information processing apparatus 10A. FIG. 5 is a block diagram illustrating an example of a functional configuration of the information processing apparatus 10A according to the present modification.

The information processing apparatus 10A includes the processing unit 12A, the white list storage 14, the prior calculation result storage 15, and a related program list storage 22. The processing unit 12A is connected with the prior calculation result storage 15, the white list storage 14, and the related program list storage 22 such that they are capable of transmitting and receiving data and/or signals to and from each other. The white list storage 14 and the prior calculation result storage 15 are the same as those in the first embodiment.

The related program list storage 22 stores therein a related program list 22A. The related program list 22A is a list associating program identifiers identifying the specific programs with related identifiers identifying related programs related to the specific programs. The definitions of the specific program, the related program, and the related identifier are the same as those in the first embodiment.

The related program list storage 22 stores therein the related program list 22A in advance. For example, the related program list 22A is generated and/or updated when the white list 14A is prepared and/or updated.

The program identifiers registered in the related program list 22A are part of a plurality of program identifiers registered in the white list 14A.

For example, the processing unit 12A extracts part of a plurality of program identifiers included in the white list 14A, when the white list 14A is generated and/or updated. The processing unit 12A specifies a related identifier of a related program related to the program identified with the extracted program identifier. For example, the processing unit 12A specifies an identifier of another program called from the program identified with the extracted program identifier, as related identifier.

The processing unit 12A associates the program identifier extracted from the white list 14A with the related identifier of the related program related to the program identified with the program identifier, and registers them in the related program list 22A.

The following is an explanation of the processing unit 12A. The processing unit 12A includes the acquirer 30A, the determiner 30B, the checksum calculator 30C, the specifier 30D, the verifier 30E, an estimator 31F, the related program checksum calculator 30G, and the storage processor 30H. The processing unit 12A is similar to the processing unit 12 according to the first embodiment, except that the processing unit 12A includes the estimator 31F, instead of the estimator 30F.

The estimator 31F estimates a related program related to the program identified with the specific program identifier, from the related program list 22A. Specifically, the estimator 31F reads a related identifier corresponding to the specific program identifier in the related program list 22A, to estimate a related program identified with the related identifier.

The estimator 31F may process the related program list 22A and/or add data, when the estimator 31F reads a related identifier.

For example, the estimator 31F reads another related identifier corresponding to the program identifier indicating each related identifier, for each of the related identifiers corresponding to the specific program identifier and read from the related program list 22A. The estimator 31F may further associate the read related identifier with the specific program identifier, and register the related identifier. In this manner, the estimator 31F may add another related identifier to the related program list 22A.

In addition, for example, the estimator 31F may select a certain number of related identifiers from a plurality of related identifiers corresponding to the specific program identifier and read from the related program list 22A, and may delete the selected related identifiers from the related program list 22A.

As described above, with the estimator 31F estimating the related program using the related program list 22A, the information processing apparatus 10A according to the present modification is enabled to further shorten the processing time for the whole processing unit 12A, in addition to the advantageous effects of the first embodiment described above.

Second Embodiment

The first embodiment described above illustrates the case where the calculation result for a related program is a checksum of the related program, as an example.

However, as explained in the first embodiment described above, the calculation result for a related program may be at least one of a checksum of the related program, and an index indicating a registration position of the program identifier indicating the related identifier in the white list 14A.

The present embodiment illustrates the case where the calculation result for a related program is an index indicating a registration position of the program identifier indicating the related identifier in the white list 14A.

In the present embodiment, the same structures and the same functions as those in the embodiment described above are denoted with the same reference numerals, and a detailed explanation thereof is omitted. In the present embodiment, the same words are used for terms indicating the same definitions as those in the embodiment described above, and a detailed explanation thereof is omitted.

FIG. 1 is a schematic diagram illustrating an example of an information processing system 1B according to the present embodiment.

The information processing system 1B includes an information processing apparatus 10B and the processing device 20. The information processing apparatus 10B and the processing device 20 are connected with each other through a wired line or wireless line such that they are capable of transmitting and receiving data and/or signals to and from each other. The processing device 20 is the same as that in the first embodiment. The information processing apparatus 10B includes a processing unit 12B and a white list storage 14'.

Figure 6:
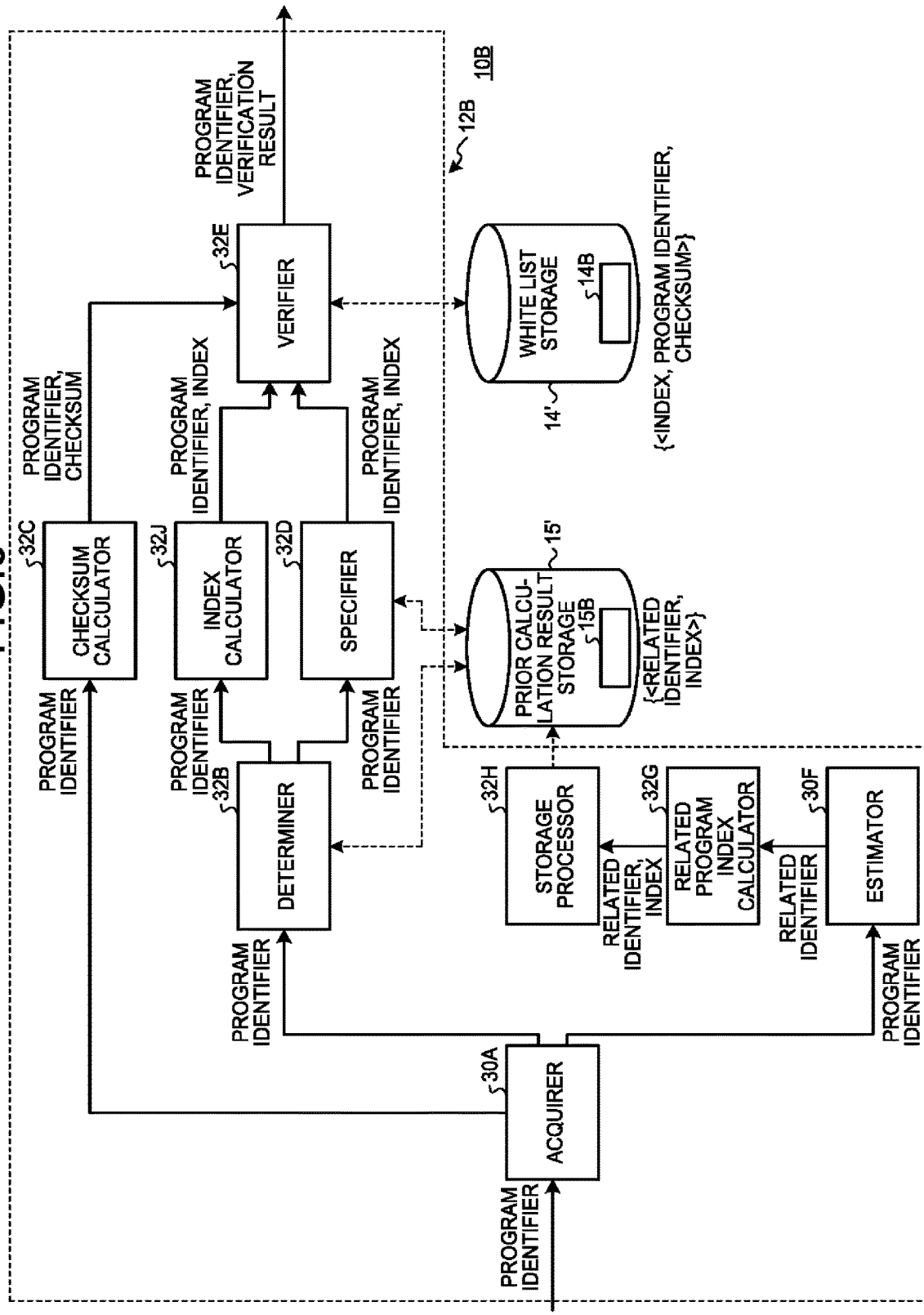
FIG. 6 is a block diagram illustrating a functional configuration of the information processing apparatus.

The following is an explanation of the information processing apparatus 10B. FIG. 6 is a block diagram illustrating an example of a functional configuration of the information processing apparatus 10B according to the present embodiment.

The information processing apparatus 10B includes the processing unit 12B, the white list storage 14', and the prior calculation result storage 15'. The processing unit 12B is connected with the prior calculation result storage 15' and the white list storage 14' such that they are capable of transmitting and receiving data and/or signals to and from each other.

The white list storage 14' stores therein a white list 14B, instead of the white list 14A.

The white list 14B is a list associating indexes, program identifiers of programs serving as targets for which execution is allowed, and checksums of the programs.

Each of the indexes indicates a registration position of the program identifier in the white list 14B. For this reason, the indexes depend on the structure of the white list 14B.

For example, suppose that the white list 14B is a file stored on a file system in the white list storage 14', and registers a pair of the program identifier and the checksum in each row. In this case, each of the indexes is a row number in which the program identifier is registered in the white list 14B.

In addition, for example, suppose that the white list 14B is a file stored on the file system in the white list storage 14', and describes pairs of the program identifiers and the checksums in a binary form. In this case, each of the indexes is a byte position on the file for a pair of the program identifier and the checksum.

As another example, suppose that the white list 14B is stored in database software in the white list storage 14'. In this case, each of the indexes is a search key or a search query to search for a pair of the program identifier and the checksum.

As another example, suppose that the white list 14B is read onto the memory. In this case, each of the indexes is a virtual/physical address indicating the position of a pair of the program identifier and the checksum on the memory.

Each of the indexes may be a value obtained from the program identifier using a hash function.

As another example, suppose that pairs of the program identifiers and the checksums are stored in accordance with a specific data structure. In this case, each of the indexes may be an index in accordance with the data structure. For example, suppose that the specific data structure is a structure in which a specific program identifier is assigned to a node of a tree structure. In this case, each of the indexes is a path from the root node.

The prior calculation result storage 15' stores therein a prior calculation result list 15B, instead of the prior calculation result list 15A. The prior calculation result list 15B is a list associating related identifiers with indexes. Specifically, the prior calculation result list 15B is a list registering indexes, instead of the checksums in the prior calculation result list 15A.

Specifically, in the present embodiment, the prior calculation result list 15B is a list registering related identifiers of related programs related to specific programs, and indexes indicating registration positions of program identifiers indicating the related identifiers in the white list 14B, in association with each other.

The following is an explanation of the processing unit 12B. The processing unit 12B includes the acquirer 30A, a determiner 32B, a checksum calculator 32C, a specifier 32D, an index calculator 32J, a verifier 32E, the estimator 30F, a related program index calculator 32G, and a storage processor 32H.

Each of the units (the acquirer 30A, the determiner 32B, the checksum calculator 32C, the specifier 32D, the index calculator 32J, the verifier 32E, the estimator 30F, the related program index calculator 32G, and the storage processor 32H) described above is achieved with, for example, one or a plurality of processors.

For example, each of the units described above may be achieved by causing a processor, such as a central processing unit (CPU), to execute a computer program, that is, with software. Each of the units described above may be achieved with a processor, such as a dedicated integrated circuit (IC), that is, hardware. Each of the units may be achieved with software and hardware used together. In the case of using a plurality of processors, each of the processors may achieve one of the units, or two or more of the units.

The acquirer 30A is the same as that in the first embodiment. However, the acquirer 30A outputs the acquired program identifier to the checksum calculator 32C, the determiner 32B, and the estimator 30F.

The checksum calculator 32C calculates a checksum of the program identified with the program identifier received from the acquirer 30A. The checksum calculator 32C calculates a checksum in the same manner as the checksum calculator 30C. The checksum calculator 32C outputs the program identifier received from the acquirer 30A and the calculated checksum to the verifier 32E.

The determiner 32B determines whether calculation of an index is required for the program identified with the program identifier received from the acquirer 30A. The determiner 32B performs determination using the prior calculation result list 15B stored in the prior calculation result storage 15'.

The determiner 32B determines whether the related identifier indicating the program identifier acquired with the acquirer 30A and the index corresponding to the related identifier are registered in the prior calculation result list 15B. By the determination, the determiner 32B determines whether calculation of the index is required.

When the determiner 32B determines that calculation of the index is required, the determiner 32B outputs the program identifier received from the acquirer 30A to the index calculator 32J.

The index calculator 32J calculates an index of the received program identifier. For example, the index calculator 32J calculates the index of the received program identifier, by specifying the registration position of the program identifier in the white list 14B. The index calculator 32J outputs the program identifier and the index to the verifier 32E.

By contrast, when the determiner 32B determines that calculation of the index is not required, the determiner 32B outputs the program identifier received from the acquirer 30A to the specifier 32D.

The specifier 32D reads the index corresponding to the related identifier indicating the program identifier received from the determiner 32B, from the prior calculation result list 15B. In this manner, the specifier 32D specifies the index corresponding to the received program identifier. The specifier 32D outputs the program identifier received from the determiner 32B and the specified index to the verifier 32E.

The verifier 32E verifies whether the program serving as an execution target is permitted to be executed, on the basis of the acquired program identifier, the index corresponding to the related identifier indicating the acquired program identifier in the prior calculation result list 15B, and the white list 14B.

Specifically, the verifier 32E receives the program identifier and the checksum from the checksum calculator 32C. The verifier 32E also receives the program identifier and the index from the index calculator 32J or the specifier 32D.

The verifier 32E searches the white list 14B using the received index, to retrieve the program identifier and the checksum corresponding to the index from the white list 14B. Using the received index enables the verifier 32E to shorten the time for retrieving the program identifier and the checksum from the white list 14B.

In addition, the verifier 32E verifies whether the checksum retrieved from the white list 14B agrees with the checksum received from the checksum calculator 32C. When the checksums agree, the verifier 32E derives a verification result indicating that the program identified with the program identifier acquired with the acquirer 30A is permitted to be executed.

By contrast, when the program identifier acquired with the acquirer 30A is not registered in the white list 14B, the verifier 32E derives a verification result indicating that the program is not permitted to be executed. The verifier 32E also derives a verification result indicating that the program is not permitted to be executed, when checksum received from the checksum calculator 32C does not agree with the checksum retrieved from the white list 14B.

As described above, when the related identifier indicating the program identifier acquired with the acquirer 30A is registered in the prior calculation result list 15B, the verifier 32E performs verification processing, by searching the white list 14B using the index specified from the prior calculation result list 15B. This structure enables the information processing apparatus 10B to shorten the time for searching the white list 14B.

By contrast, in the same manner as the first embodiment, the estimator 30F estimates a related program related to the program identified with the specific program identifier in the white list 14B. For example, in the same manner as the first embodiment, the estimator 30F estimates a related program related to the program identified with the program identifier received from the acquirer 30A. The estimator 30F outputs the related identifier of the estimated related program to the related program index calculator 32G.

The related program index calculator 32G calculates an index of the related program identified with the related identifier received from the estimator 30F. The related program index calculator 32G outputs the related identifier and the index corresponding to the related identifier to the storage processor 32H.

The storage processor 32H associates the related identifier and the index received from the related program index calculator 32G, and registers them in the prior calculation result list 15B.

Figure 7:
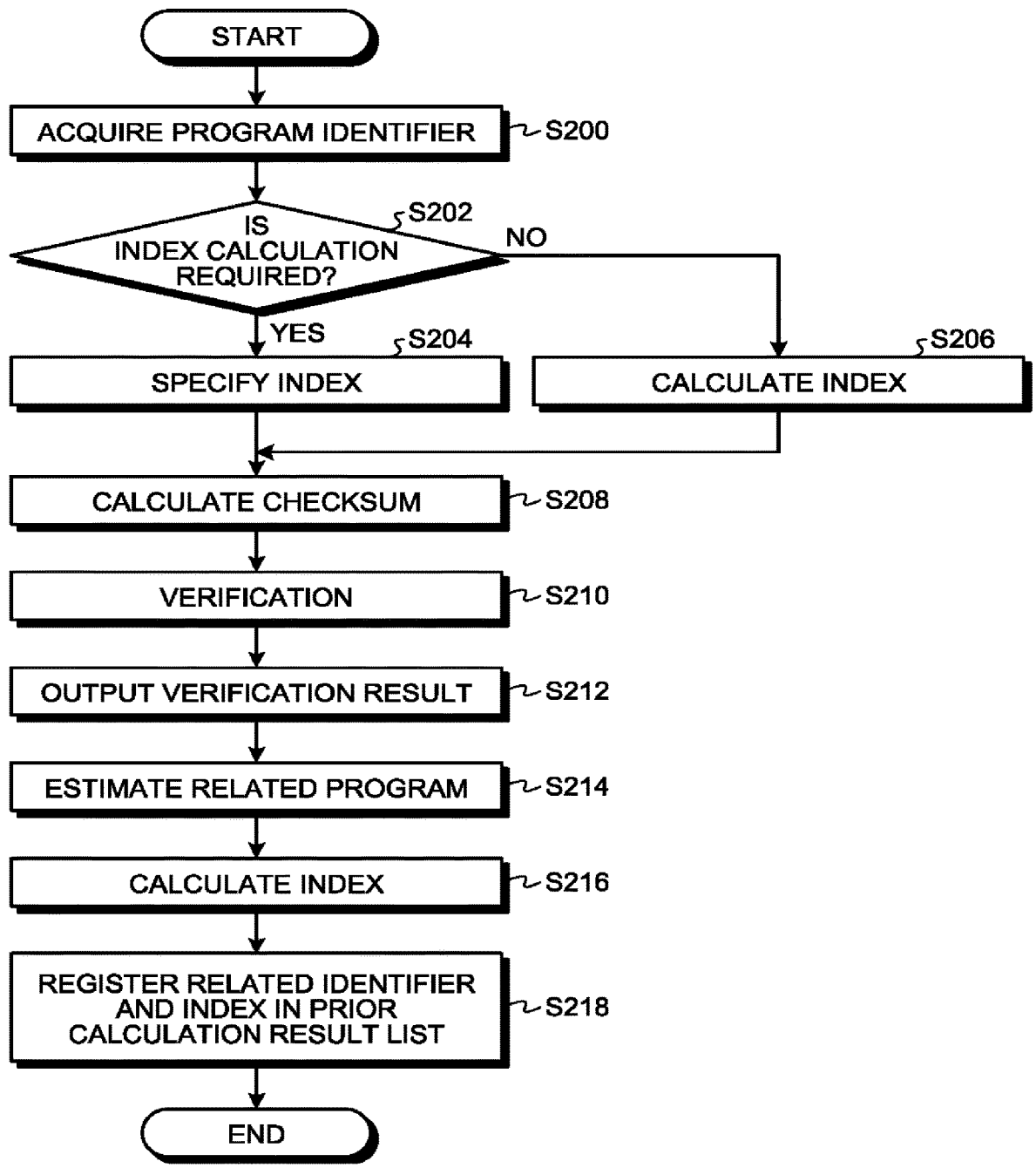
FIG. 7 is a flowchart illustrating an example of a process of information processing.

The following is an explanation of an example of a process of information processing executed with the information processing apparatus 10B according to the present embodiment. FIG. 7 is a flowchart illustrating an example of the process of information processing executed with the information processing apparatus 10B according to the present embodiment. The flowchart illustrated in FIG. 7 is an example of a detailed explanation of the processing at Step S7 and Step S8, and the processing at Step S21 and Step S22 illustrated in FIG. 2.

First, the acquirer 30A acquires a computer program identifier for identifying the program serving as an execution target (Step S200).

Thereafter, the determiner 32B determines whether calculation of an index is required, for the program identified with the program identifier acquired at Step S200 (Step S202). The determiner 32B executes determination using the prior calculation result list 15B. When the determination at Step S202 is negative (No at Step S202), the process proceeds to Step S204.

At Step S204, the specifier 32D reads the index corresponding to the related identifier indicating the program identifier acquired at Step S200, from the prior calculation result list 15B. In this manner, the specifier 32D specifies the index corresponding to the received program identifier (Step S204). Thereafter, the process proceeds to Step S208.

By contrast, when the determination at Step S202 is affirmative (Yes at Step S202), the process proceeds to Step S206. At Step S206, the index calculator 32J calculates the index of the received program identifier (Step S206). Thereafter, the process proceeds to Step S208.

At Step S208, the checksum calculator 32C calculates a checksum of the program identified with the program identifier acquired at Step S200 (Step S208). Thereafter, the process proceeds to Step S210.

At Step S210, the verifier 32E verifies whether the program identified with the program identifier acquired at Step S200 is permitted to be executed (Step S210), using the index derived at Step S204 or Step S206, the checksum calculated at Step S208, the program identifier, and the white list 14B. The verifier 32E outputs a verification result indicating that the program is permitted to be executed or not permitted to be executed to the processing device 20 (Step 3212).

Thereafter, the estimator 30F estimates a related program related to the program identified with the program identifier acquired at Step S200 (Step S214).

Thereafter, the related program index calculator 32G calculates an index of the related program estimated at Step S214 (Step S216). Thereafter, the storage processor 32H associates the related identifier of the related program estimated at Step S214 with the index calculated for the related program at Step S216, and registers them in the prior calculation result list 15B (Step S218). Thereafter, the present routine is finished.

As explained above, the information processing apparatus 10B according to the present embodiment uses an index indicating the registration position of the program identifier in the white list 14B, as calculation result. With this structure, the verifier 32E is enabled to shorten the search time, by searching the white list 14B using the received index in verification processing.

In prior art, more time is required for retrieval of the program identifier from the white list 14B in verification of the program, as the number of program identifiers registered in the white list 14B increases. This structure may cause increase in the verification time.

By contrast, the information processing apparatus 10B according to the present embodiment has the structure in which the verifier 32E searches the white list 14B using the received index in verification processing. This structure enables the information processing apparatus 10B to shorten the time for searching the white list 14B in verification processing.

Accordingly, the information processing apparatus 10B according to the present embodiment is capable of shortening the time for verifying the program using the white list 14B.

The structure of the information processing apparatus 10B is not limited to the structure described above. For example, the determiner 32B of the information processing apparatus 10B may further include the function of the determiner 30B explained in the first embodiment. In this case, the prior calculation result list 15B has a structure of registering the related identifiers, the checksums, and the indexes in association with each other.

In addition, in this case, the determiner 32B determines whether the checksum and the index corresponding to the related identifier indicating the program identifier acquired from the acquirer 30A are registered in the prior calculation result list 15A.

When the determiner 32B determines that the checksum and the index are registered, the specifier 32D specifies the checksum and the index corresponding to the related identifier from the prior calculation result list 15B, and outputs the checksum and the index to the verifier 32E. The verifier 32E searches the white list 14B using the received index, and executes verification processing using the program identifier and the checksum registered in the position specified with the index, and the checksum received from the specifier 32D.

This structure enables the information processing apparatus 10B according to the present embodiment to further shorten the verification time using the white list 14B, in addition to the advantageous effects described above.

Third Embodiment

In the embodiments described above, the verifier 30E or 32E executes verification processing using the white list 14A or the white list 14B.

The present embodiment illustrates the form in which verification processing is executed using the prior calculation result list 15A and the white list 14A.

In the present embodiment, the same structures and the same functions as those in the embodiments described above are denoted with the same reference numerals, and a detailed explanation thereof is omitted. In the present embodiment, the same words are used for terms indicating the same definitions as those in the embodiments described above, and a detailed explanation thereof is omitted.

FIG. 1 is a schematic diagram illustrating an example of an information processing system IC according to the present embodiment.

The information processing system IC includes an information processing apparatus 10C and the processing device 20. The information processing apparatus 10C and the processing device 20 are connected with each other through a wired line or wireless line such that they are capable of transmitting and receiving data and/or signals to and from each other. The processing device 20 is the same as that in the first embodiment. The information processing apparatus 10C includes a processing unit 12C and the white list storage 14.

Figure 8:
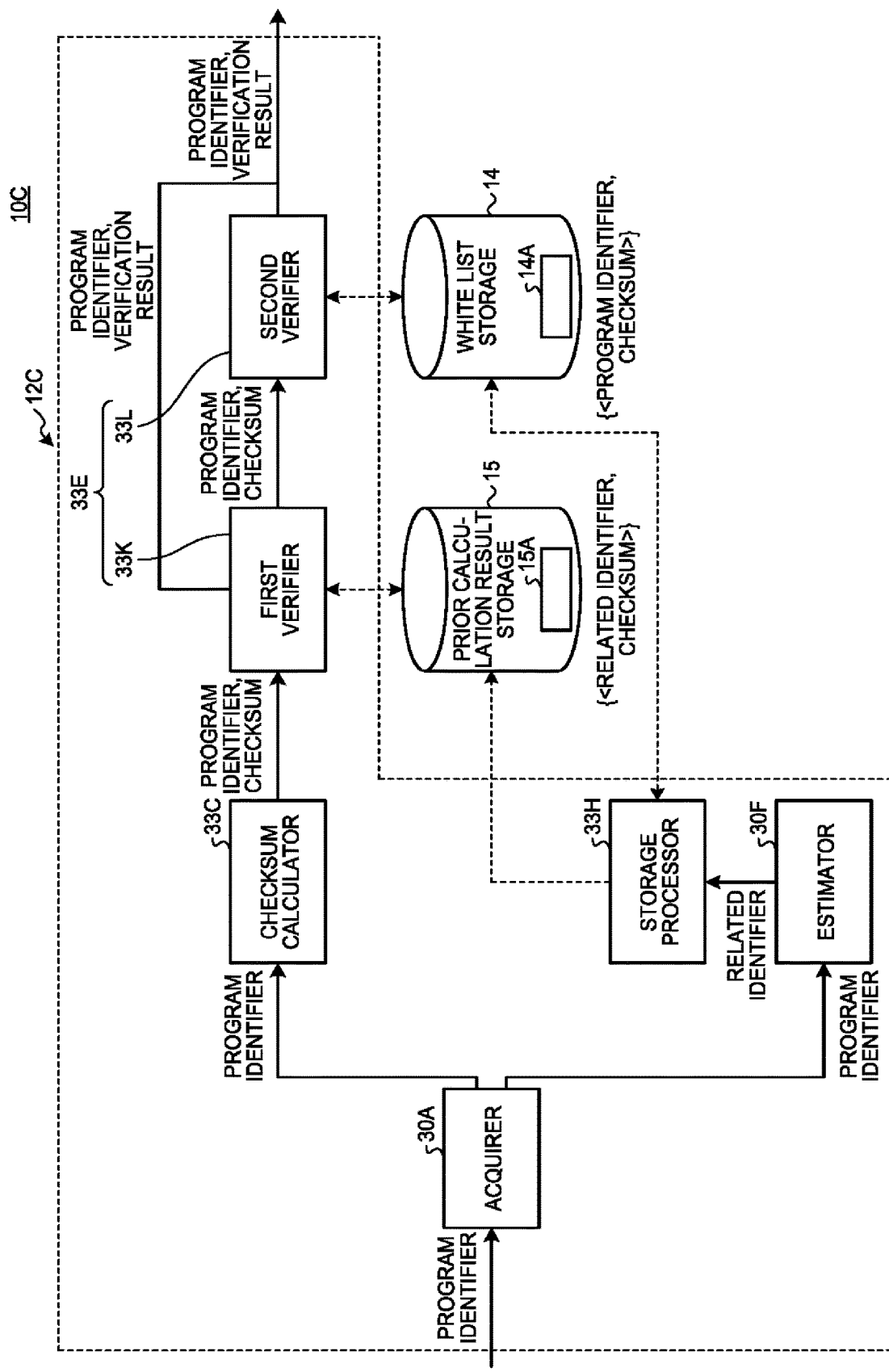
FIG. 8 is a block diagram illustrating a functional configuration of the information processing apparatus.

The following is an explanation of the information processing apparatus 10C. FIG. 8 is a block diagram illustrating an example of a functional configuration of the information processing apparatus 10C according to the present embodiment.

The information processing apparatus 10C includes the processing unit 12C, the white list storage 14, and the prior calculation result storage 15. The processing unit 12B is connected with the prior calculation result storage 15 and the white list storage 14 such that they are capable of transmitting and receiving data and/or signals to and from each other.

The white list storage 14 and the prior calculation result storage 15 are the same as those in the first embodiment. Specifically, the white list storage 14 stores therein the white list 14A. The prior calculation result storage 15 stores therein the prior calculation result list 15A.

The following is an explanation of the processing unit 12C. The processing unit 12C includes the acquirer 30A, a checksum calculator 33C, a verifier 33E, the estimator 30F, and a storage processor 33H.

Each of the units (the acquirer 30A, the checksum calculator 33C, the verifier 33E, the estimator 30F, and the storage processor 33H) described above is achieved with, for example, one or a plurality of processors.

For example, each of the units described above may be achieved by causing a processor, such as a central processing unit (CPU), to execute a computer program, that is, with software. Each of the units described above may be achieved with a processor, such as a dedicated integrated circuit (IC), that is, hardware. Each of the units may be achieved with software and hardware used together. In the case of using a plurality of processors, each of the processors may achieve one of the units, or two or more of the units.

The acquirer 30A is the same as that in the first embodiment. However, the acquirer 30A outputs the acquired program identifier to the checksum calculator 33C and the estimator 30F.

The estimator 30F estimates a related program related to the program identified with the specific program identifier in the white list 14A, in the same manner as the first embodiment. For example, in the same manner as the first embodiment, the estimator 30F estimates a related program related to the program identifier received from the acquirer 30A.

The estimator 30F outputs the related identifier of the estimated related program to the storage processor 33H.

The storage processor 33H reads a checksum corresponding to the program identifier indicating the related identifier received from the estimator 30F, from the white list 14A. In addition, the storage processor 33H associates the related identifier received from the estimator 30F with the checksum read from the white list 14A, and registers them in the prior calculation result list 15A.

In the present embodiment, the number of related identifiers registered in the prior calculation result list 15A is smaller than the number of program identifiers registered in the white list 14A.

In the present embodiment, the storage processor 33H updates the prior calculation result storage 15, to maintain the relation.

For example, when a new related identifier is registered in the prior calculation result list 15A, the storage processor 33H deletes part of the pairs of related identifiers and checksums corresponding to the related identifiers already registered in the prior calculation result list 15A.

Specifically, when the number of related identifiers registered in the prior calculation result list 15A exceeds the preset upper limit value, the storage processor 33H deletes the related identifiers satisfying predetermined conditions, among the related identifiers registered in the prior calculation result storage 15, and the checksums corresponding to the related identifiers, from the prior calculation result storage 15. The related identifiers satisfying predetermined conditions are for example, a predetermined number of related identifiers arranged in order from the related identifier with the oldest date and time of registration in the prior calculation result storage 15, or a predetermined number of related identifiers that have not been used for verification with the verifier 33E for a predetermined period or more.

As described above, the storage processor 33H registers new related identifiers and checksums in the prior calculation result list 15A, and performs adjustment such that the number of registered related identifiers is smaller than the number of program identifiers registered in the white list 14A.

The following is an explanation of the checksum calculator 33C. The checksum calculator 33C calculates a checksum of the program identified with the program identifier received from the acquirer 30A. The checksum calculator 33C calculates a checksum in the same manner as the checksum calculator 30C. The checksum calculator 33C outputs the program identifier received from the acquirer 30A and the calculated checksum to the verifier 33E.

The verifier 33E verifies whether the program serving as an execution target and identified with the acquired program identifier is permitted to be executed.

In the present embodiment, the verifier 33E includes a first verifier 33K and a second verifier 33L.

The first verifier 33K verifies, using the prior calculation result list 15A, whether the program serving as an execution target is permitted to be executed.

Specifically, the first verifier 33K receives the program identifier and the checksum from the checksum calculator 33C. The first verifier 33K determines whether the related identifier indicating the acquired program identifier is registered in the prior calculation result list 15A.

Suppose that the related identifier indicating the acquired program identifier is registered in the prior calculation result list 15A.

In this case, the first verifier 33K verifies whether the program serving as an execution target is permitted to be executed, on the basis of the program identifier, the calculation result for the program identified with the program identifier, and the prior calculation result list 15A. Specifically, the first verifier 33K specifies a checksum corresponding to the related identifier indicating the program identifier received from the checksum calculator 33C, from the prior calculation result list 15A. When the checksum calculated with the checksum calculator 33C agrees with the checksum specified from the prior calculation result list 15A, the first verifier 33K verifies that the program serving as an execution target is permitted to be executed.

When the checksum received from the checksum calculator 33C does not agree with the checksum specified from the prior calculation result list 15A, the first verifier 33K verifies that the program serving as an execution target is not permitted to be executed.

Thereafter, the first verifier 33K outputs the program identifier received from the checksum calculator 33C and the verification result to the processing device 20.

By contrast, suppose that the related identifier indicating the program identifier acquired with the acquirer 30A is not registered in the prior calculation result list 15A. In this case, the first verifier 33K performs no verification processing, but outputs the program identifier received from the checksum calculator 33C and the checksum to the second verifier 33L. Thereafter, the second verifier 33L executes verification processing.

When the related identifier indicating the acquired program identifier is not registered in the prior calculation result list 15A, the second verifier 33L verifies whether the program serving as an execution target is permitted to be executed.

Specifically, the second verifier 33L verifies whether the program serving as an execution target is permitted to be executed, on the basis of the acquired program identifier, the calculation result (checksum) for the program identified with the program identifier, and the white list 14A.

Specifically, the second verifier 33L specifies a checksum corresponding to the program identifier received from the first verifier 33K from the white list 14A. Thereafter, when the checksum calculated with the checksum calculator 33C agrees with the checksum specified from the white list 14A, the second verifier 33L verifies that the program serving as an execution target is permitted to be executed.

The second verifier 33L verifies that the program serving as an execution target is not permitted to be executed, when the program identifier received from the first verifier 33K is not registered in the white list 14A. In addition, the first verifier 33K verifies that the program serving as an execution target is not permitted to be executed, when the checksum corresponding to the program identifier in the white list 14A does not agree with the checksum received from the checksum calculator 33C through the first verifier 33K.

Thereafter, the second verifier 33L outputs the program identifier received from the checksum calculator 33C through the first verifier 33K and the verification result to the processing device 20.

Figure 9:
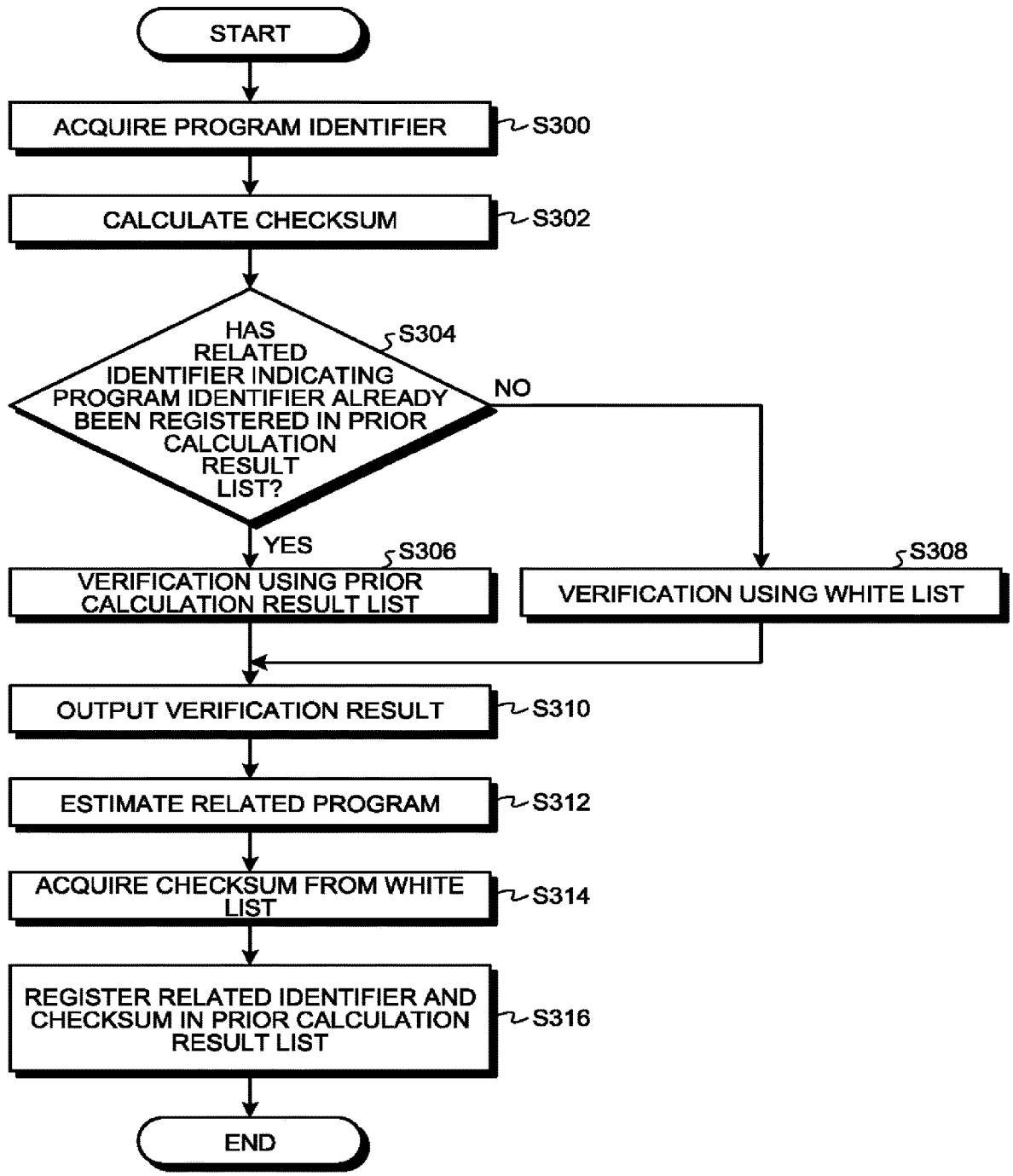
FIG. 9 is a flowchart illustrating an example of a process of information processing.

The following is an explanation of an example of a process of information processing executed with the information processing apparatus 10C according to the present embodiment. FIG. 9 is a flowchart illustrating an example of the process of information processing executed with the information processing apparatus 10C according to the present embodiment. The flowchart illustrated in FIG. 9 is an example of a detailed explanation of the processing at Step S7 and Step S8 and the processing at Step S21 and Step S22 illustrated in FIG. 2.

First, the acquirer 30A acquires a computer program identifier for identifying the program serving as an execution target (Step S300).

Thereafter, the checksum calculator 33C calculates a checksum of the program identified with the program identifier acquired at Step S300 (Step S302).

Thereafter, the first verifier 33K determines whether the related identifier indicating the program identifier acquired at Step S300 is registered in the prior calculation result list 15A (Step S304). When affirmative determination is made at Step S304 (Yes at Step S304), the first verifier 33K verifies the program identified with the program identifier acquired at Step S300, using the prior calculation result list 15A (Step S306). Thereafter, the process proceeds to Step S310.

By contrast, when negative determination is made at Step S304 (No at Step S304), the process proceeds to Step S308. At Step S308, the second verifier 33L verifies the program identified with the program identifier acquired at Step S300, using the white list 14A (Step S308). Thereafter, the process proceeds to Step S310.

Thereafter, at step S310, the verifier 33E (the first verifier 33K and the second verifier 33L) outputs the verification result at step S306 or S308 and the program identifier acquired at step S300 to the processing device 20 (step S310).

Thereafter, the estimator 30F estimates a related program related to the program identified with the program identifier acquired at Step S300 (Step S312).

Thereafter, the storage processor 33H acquires the checksum of the related program estimated at Step S312, from the white list 14A (Step S314). Specifically, the storage processor 33H reads the checksum corresponding to the program identifier indicating the related identifier of the related program estimated at Step S312, from the white list 14A. In this manner, the storage processor 33H acquires the checksum from the white list 14A.

Thereafter, the storage processor 33H associates the related identifier of the related program estimated at Step S312 with the checksum acquired at Step S314, and registers them in the prior calculation result list 15A (Step S316). Thereafter, the present routine is finished.

As explained above, in the present embodiment, the number of related identifiers registered in the prior calculation result list 15A is smaller than the number of program identifiers registered in the white list 14A. In addition, when the related identifier indicating the acquired program identifier is registered in the prior calculation result list 15A, the first verifier 33K verifies the program serving as an execution target using the prior calculation result list 15A. By contrast, when the related identifier indicating the acquired program identifier is not registered in the prior calculation result list 15A, the second verifier 33L verifies the program serving as an execution target using the white list 14A.

With this structure, the information processing apparatus 10C according to the present embodiment is enabled to shorten the time for searching the white list 14A with more data amount than that of the prior calculation result list 15A.

Specifically, the number of related identifiers registered in the prior calculation result list 15A is smaller than the number of program identifiers registered in the white list 14A. For this reason, the verification time of the first verifier 33K is shorter than the verification time of the second verifier 33L. This is because the time required for search is shorter. In addition, the information processing apparatus 10C according to the present embodiment has the structure in which the first verifier 33K executes verification processing using the prior calculation result list 15A enabling verification for a shorter time, for the program identified with the program identifier indicating the related identifier registered in the prior calculation result list 15A.

Accordingly, the information processing apparatus 10C according to the present embodiment is enabled to shorten the time for verifying the program using the white list 14A.

Fourth Embodiment

The modification described above illustrates the case where the estimator 31F estimates a related program using the related program list 22A generated in advance. The present embodiment further illustrates the form in which the related program list 22A is dynamically generated and updated.

In the present embodiment, the same structures and the same functions as those in the embodiments and the modification described above are denoted with the same reference numerals, and a detailed explanation thereof is omitted. In the present embodiment, the same words are used for terms indicating the same definitions as those in the embodiments and the modification described above, and a detailed explanation thereof is omitted.

FIG. 1 is a schematic diagram illustrating an example of an information processing system 1D according to the present embodiment.

The information processing system 1D includes an information processing apparatus 10D and the processing device 20. The information processing apparatus 10D and the processing device 20 are connected with each other through a wired line or wireless line such that they are capable of transmitting and receiving data and/or signals to and from each other. The processing device 20 is the same as that in the first embodiment. The information processing apparatus 10D includes a processing unit 12D and the white list storage 14.

Figure 10:
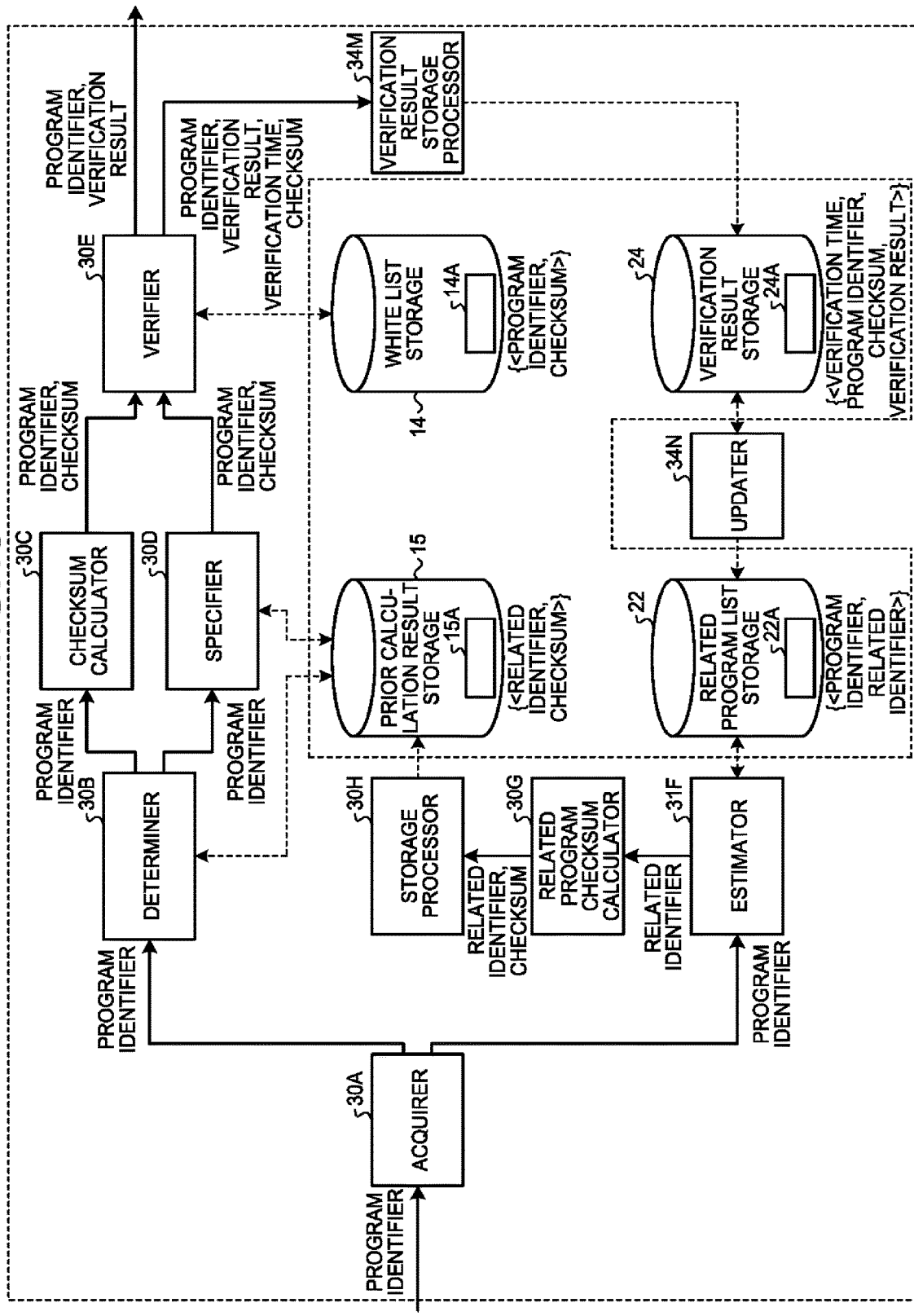
FIG. 10 is a block diagram illustrating a functional configuration of the information processing apparatus.

The following is an explanation of the information processing apparatus 10D. FIG. 10 is a block diagram illustrating an example of a functional configuration of the information processing apparatus 10D according to the present embodiment.

The information processing apparatus 10D includes the processing unit 12D, the white list storage 14, the prior calculation result storage 15, the related program list storage 22, and a verification result storage 24. The processing unit 12D is connected with the prior calculation result storage 15, the white list storage 14, the related program list storage 22, and the verification result storage 24 such that they are capable of transmitting and receiving data and/or signals to and from each other. The white list storage 14 and the prior calculation result storage 15 are the same as those in the first embodiment. The related program list storage 22 is the same as that in the modification. The related program list storage 22 is updated with the processing unit 12D (the details thereof will be described later).

The verification result storage 24 stores therein a verification result list 24A. The verification result list 24A is a list registering verification results obtained with the verifier 30E. Specifically, the verification result list 24A is a list associating verification results with pieces of verification information.

The verification information is information relating to verification with the verifier 30E. For example, the verification information is information indicating the order (referred to as "verification order") of verification with the verifier 30E. Specifically, the verification information is the verification time, the serial number indicating the number of verifications with the verifier 30E, the index, the program identifier, the checksum, and/or information indicating the information processing apparatus 10D. The definition of the index is the same as that in the embodiment described above. The information indicating the information processing apparatus 10D is, for example, the startup time of the information processing apparatus 10D, the hardware usage state of the information processing apparatus 10D, and the name of the user who uses the information processing apparatus 10D.

The present embodiment illustrates the case where each piece of the verification information includes the verification time, the program identifier, and the checksum, as an example.

The verification result list 24A is updated with the processing unit 12D (the details thereof will be described later).

The processing unit 12D includes the acquirer 30A, the determiner 30B, the checksum calculator 30C, the specifier 30D, the verifier 30E, the estimator 31F, the related program checksum calculator 30G, the storage processor 30H, an updater 34N, and a verification result storage processor 34M. The processing unit 12D is similar to the processing unit 12A of the modification, except that the processing unit 12D further includes the updater 34N and the verification result storage processor 34M.

The verification result storage processor 34M registers a verification result obtained with the verifier 30E in the verification result list 24A.

For example, the verification result storage processor 34M receives a verification result and verification information from the verifier 30E, whenever the verifier 30E executes processing of verifying the program using the white list 14A.

The verification result storage processor 34M associates the verification result with the verification information, and registers them in the verification result list 24A. For example, the verification result storage processor 34M associates the verification result, the program identifier, the verification time, and the checksum with each other, and registers them in the verification result list 24A.

The verification result storage processor 34M may register these pieces of information in the verification result list 24A, only when the verification result indicates that the program is permitted to be executed.

The verification result storage processor 34M may further perform processing or addition on the verification result list 24A. For example, the verification result storage processor 34M may generate a serial number for the program identifier registered in the verification result list 24A, on the basis of the verification time. In addition, the verification result storage processor 34M may further register the generated serial number in association with the program identifier in the verification result list 24A.

The verification result storage processor 34M may also delete the verification result for which a predetermined period or more has passed, among verification results stored in the verification result list 24A, from the verification result list 24A. In the deletion, the verification result storage processor 34M deletes the verification result serving as a deletion target, and the verification information (such as the program identifier, the checksum, and the verification time) corresponding to the verification result together.

The verification result storage processor 34M may also count the number of verifications performed with the verifier 30E, for each of the program identifiers registered in the verification result list 24A. The verification result storage processor 34M may also register the counted number of verifications in the verification result list 24A, in association with the program identifier.

The updater 34N updates the related program list 22A, on the basis of the verification result obtained with the verifier 30E. In other words, the updater 34N generates and updates the related program list 22A, on the basis of the verification result obtained with the verifier 30E.

Specifically, the updater 34N generates a related program list 22A from the verification result list 24A, and stores the related program list 22A in the related program list storage 22. The updater 34N also updates the related program list 22A on the basis of the verification result list 24A, periodically or whenever the verification result list 24A is updated.

For example, the updater 34N executes the following processing for each of the program identifiers stored in the verification result list 24A. First, the updater 34N specifies the verification time corresponding to a certain program identifier stored in the verification result list 24A. Thereafter, the updater 34N specifies another program identifier corresponding to the verification time within a predetermined time range from the specified verification time. The updater 34N specifies the specified program identifier as related identifier of a related program for the certain program identifier. The updater 34N associates the certain program identifier with the specified program identifier, and registers them in the related program list 22A.

The updater 34N also executes the following processing for each of the program identifiers stored in the verification result list 24A. The program identifier may be specified as related identifier of the related program for the certain program identifier stored in the verification result list 24A. The updater 34N may associate the certain program identifier with the specified related identifier, and register them in the related program list 22A.

The updater 34N also executes the following processing for each of the program identifiers stored in the verification result list 24A. The updater 34N specifies the number of verifications corresponding to the certain program identifier stored in the verification result list 24A, for the program identifier. In this case, suppose that the number of verifications is further registered in the verification result list 24A, in association with the program identifier. When the specified number of verifications exceeds a fixed number, the updater 34N may specify the program identifier as related identifier of the related program. The updater 34N may associate the certain program identifier with the specified related identifier, and register them in the related program list 22A.

In the processing executed with the updater 34N described above, a related identifier is specified for each of the program identifiers stored in the verification result list 24A, but the processing may be executed only for necessary ones. For example, the time at which the updater 34N has performed processing may be stored, and the processing described above may be executed only for program identifiers, each of which indicates the verification time after the time at which the previous processing with the updater 34N has been performed, among the program identifiers stored in the verification result list 24A.

Figure 11:
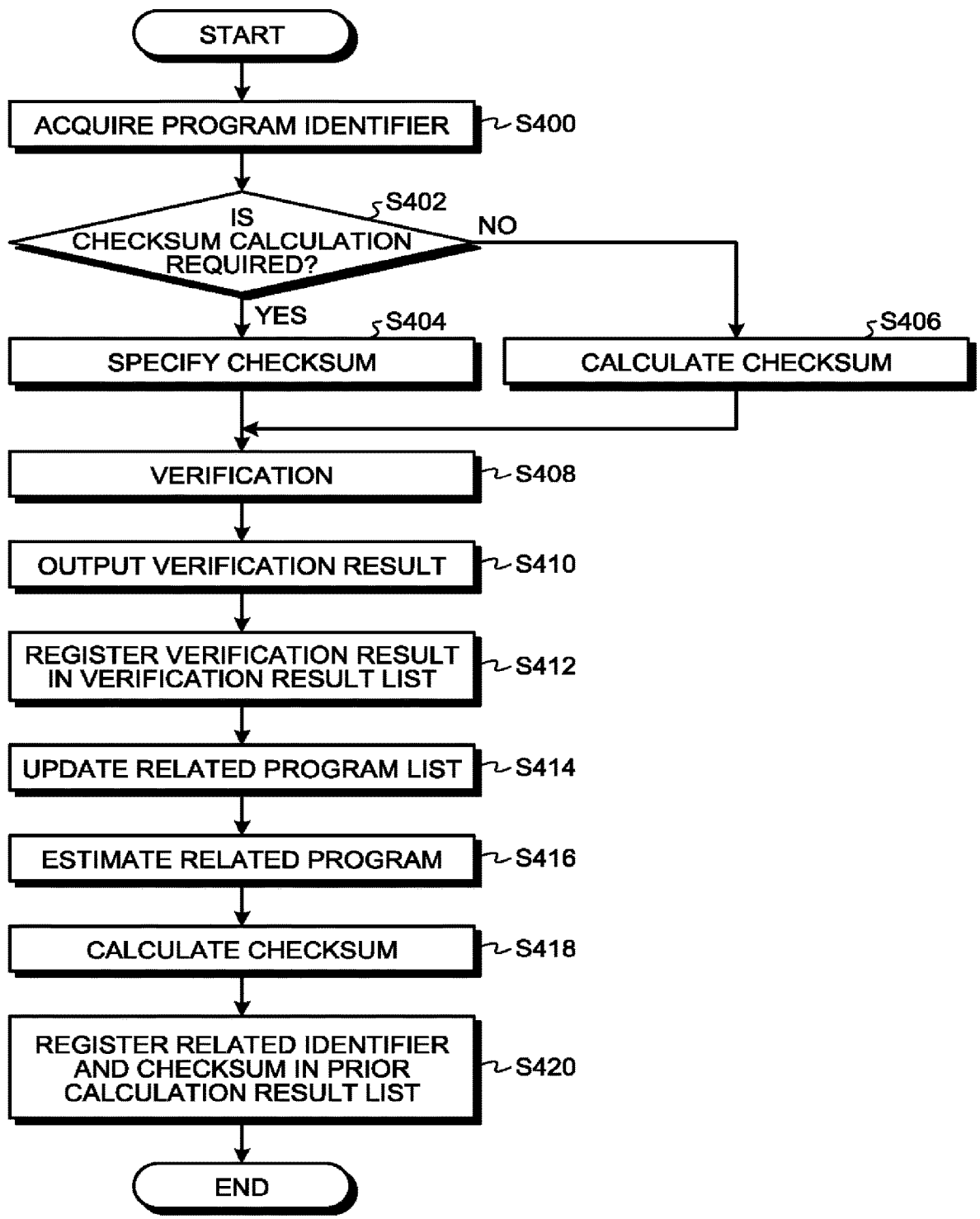
FIG. 11 is a flowchart illustrating a process of information processing.

The following is an explanation of an example of a process of information processing executed with the information processing apparatus 10D according to the present embodiment. FIG. 11 is a flowchart illustrating an example of the process of information processing executed with the information processing apparatus 10D according to the present embodiment. The flowchart illustrated in FIG. 11 is an example of a detailed explanation of the processing at Step S7 and Step S8 and the processing at Step S21 and Step S22 illustrated in FIG. 2.

The processing unit 12D executes processing at Step S400 to Step S410, in the same manner as the processing unit 12 according to the first embodiment. The processing at Step S400 to Step S410 is the same as that at Step S100 to Step S110 according to the first embodiment (see FIG. 4).

Thereafter, the verification result storage processor 34M registers a verification result and verification information obtained with the verifier 30E in the verification result list 24A (Step S412).

Thereafter, the updater 34N updates the related program list 22A, on the basis of the verification result storage 24 (Step S414).

Thereafter, the estimator 31F estimates, using the related program list 22A, a related program related to the program identified with the program identifier acquired at Step S400 (Step S416).

Thereafter, the related program checksum calculator 30G and the storage processor 30H execute processing at Step S418 to Step S420, in the same manner as the first embodiment, and the present routine is finished. The processing at Step S418 to Step S420 is the same as the processing at Step S114 to Step S116 according to the first embodiment (see FIG. 4).

As explained above, in the present embodiment, the updater 34N updates the related program list 22A, on the basis of the verification result obtained with the verifier 30E.

Specifically, in the present embodiment, the updater 34N dynamically generates and updates the related program list 22A.

With this structure, the information processing apparatus 10D according to the present embodiment is enabled to register a calculation result corresponding to change in the operational state in the prior calculation result list 15A. Accordingly, the information processing apparatus 10D according to the present embodiment is enabled to further shorten the verification time, in addition to the advantageous effects of the first embodiment described above.

Fifth Embodiment

The present embodiment illustrates the form of monitoring change in the white list 14A and the prior calculation result list 15A, and updating the white list 14A and the prior calculation result list 15A when they are changed.

In the present embodiment, the same structures and the same functions as those in the embodiments and the modification described above are denoted with the same reference numerals, and a detailed explanation thereof is omitted. In the present embodiment, the same words are used for terms indicating the same definitions as those in the embodiments and the modification described above, and a detailed explanation thereof is omitted.

FIG. 1 is a schematic diagram illustrating an example of an information processing system 1E according to the present embodiment.

The information processing system 1E includes an information processing apparatus 10E and the processing device 20. The information processing apparatus 10E and the processing device 20 are connected with each other through a wired line or wireless line such that they are capable of transmitting and receiving data and/or signals to and from each other. The processing device 20 is the same as that in the first embodiment. The information processing apparatus 10E includes a processing unit 12E and the white list storage 14.

Figure 12:
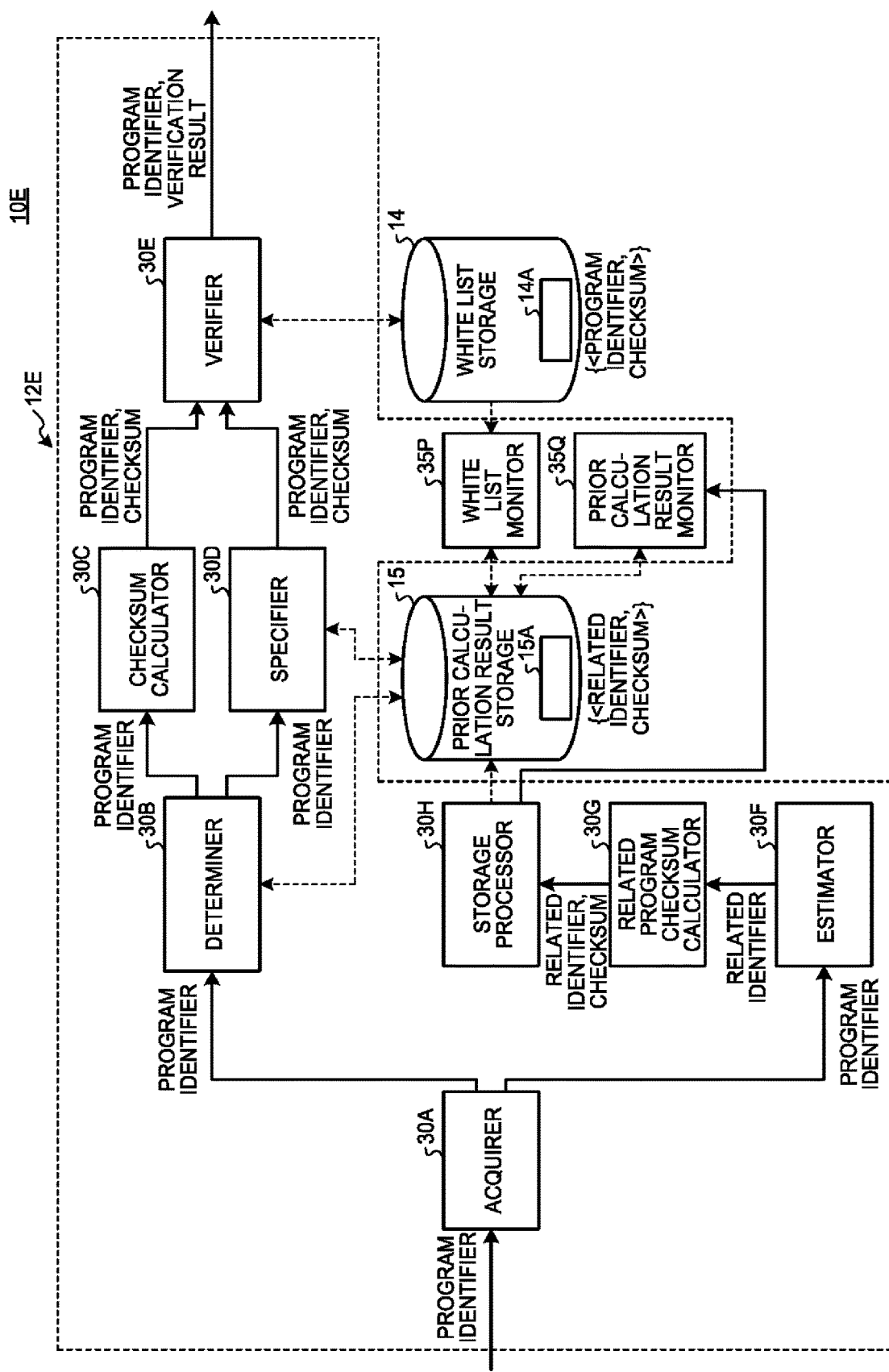
FIG. 12 is a block diagram illustrating a functional configuration of the information processing apparatus.

The following is an explanation of the information processing apparatus 10E. FIG. 12 is a block diagram illustrating an example of a functional configuration of the information processing apparatus 10E according to the present embodiment.

The information processing apparatus 10E includes the processing unit 12E, the white list storage 14, and the prior calculation result storage 15. The processing unit 12E is connected with the prior calculation result storage 15 and the white list storage 14 such that they are capable of transmitting and receiving data and/or signals to and from each other. The white list storage 14 and the prior calculation result storage 15 are the same as those in the first embodiment.

The processing unit 12E includes the acquirer 30A, the determiner 30B, the checksum calculator 30C, the specifier 30D, the verifier 30E, the estimator 30F, the related program checksum calculator 30G, the storage processor 30H, a white list monitor 35P, and a prior calculation result monitor 35Q.

The processing unit 12E is similar to the processing unit 12 according to the first embodiment, except that the processing unit 12E further includes the white list monitor 35P and the prior calculation result monitor 35Q.

The prior calculation result monitor 35Q monitors change in information relating to the prior calculation result list 15A. The information relating to the prior calculation result list 15A indicates, for example, a related program identified with the related identifier registered in the prior calculation result list 15A, the portion in which the related program is stored, and the checksum corresponding to the related identifier.

When the information relating to the prior calculation result list 15A is changed, the prior calculation result monitor 35Q updates a corresponding portion in the prior calculation result list 15A.

For example, the prior calculation result monitor 35Q monitors change in corresponding checksum, for each of related identifiers registered in the prior calculation result list 15A. When any checksum is changed, the prior calculation result monitor 35Q determines that information relating to the prior calculation result list 15A has been changed.

In addition, for example, the prior calculation result monitor 35Q specifies the portion in which the related program identified with the related identifier registered in the prior calculation result list 15A is retained. The prior calculation result monitor 35Q also detects whether any rewrite operation is performed on the specified portion.

When the prior calculation result monitor 35Q detects that any rewrite operation has been performed, the prior calculation result monitor 35Q determines that information relating to the prior calculation result list 15A has been changed.

When the prior calculation result monitor 35Q determines that information relating to the prior calculation result list 15A has been changed, for example, the prior calculation result monitor 35Q deletes the corresponding portion in the prior calculation result list 15A. Specifically, the prior calculation result monitor 35Q deletes the related identifier of the related program retained in the portion on which the rewrite operation has been performed, and the corresponding checksum, from the prior calculation result list 15A.

The kernel and/or specific hardware of the information processing apparatus 10E may be used for detection of a rewrite operation. For example, the kernel of the information processing apparatus 10E is notified of the file serving as a monitoring target. The kernel is preset to notify the prior calculation result monitor 35Q of an attempt to rewrite the file serving as a monitoring target, when the kernel detects such an attempt.

In addition, a rewrite operation may be detected, by retaining the monitoring target in a storage device (such as a programmable ROM) capable of detecting change in state caused by a rewrite operation, and reading the state of the storage device.

The white list monitor 35P monitors change in the white list 14A. When the white list 14A is changed, the white list monitor 35P updates the information corresponding to the change in the prior calculation result list 15A.

For example, suppose that the process to change the white list 14A has been started, with an operation instruction from the user having the authority to change the white list 14A. In this case, the white list monitor 35P detects change in the white list 14A. In addition, when the white list monitor 35P detects that any rewrite operation has been performed on the white list 14A, the white list monitor 35P detects change in the white list 14A.

Thereafter, the white list monitor 35P updates the information corresponding to change in the white list 14A, in the prior calculation result list 15A.

Specifically, there are cases where the program corresponding to the program identifier stored in the white list 14A is changed. In this case, the checksum of the program is recalculated, and registered again in the white list 14A in association with the program identifier. Thereafter, the white list monitor 35P changes the checksum corresponding to the related identifier indicating the program identifier of the changed program in the prior calculation result list 15A to the recalculated value.

In the case of operating the prior calculation result monitor 35Q and the white list monitor 35P simultaneously, they are required to be mounted to prevent them from interfering with each other. For example, change in the prior calculation result list 15A with the white list monitor 35P stops the rewrite detecting function of the prior calculation result monitor 35Q.

The following is an explanation of an example of a process of information processing executed with the information processing apparatus 10E according to the present embodiment. In the present embodiment, the information processing apparatus 10E executes process similar to that of the first embodiment (see FIG. 4). In addition, the information processing apparatus 10E executes interruption processing illustrated in FIG. 13, during execution of the information processing illustrated in FIG. 4.

Figure 13:
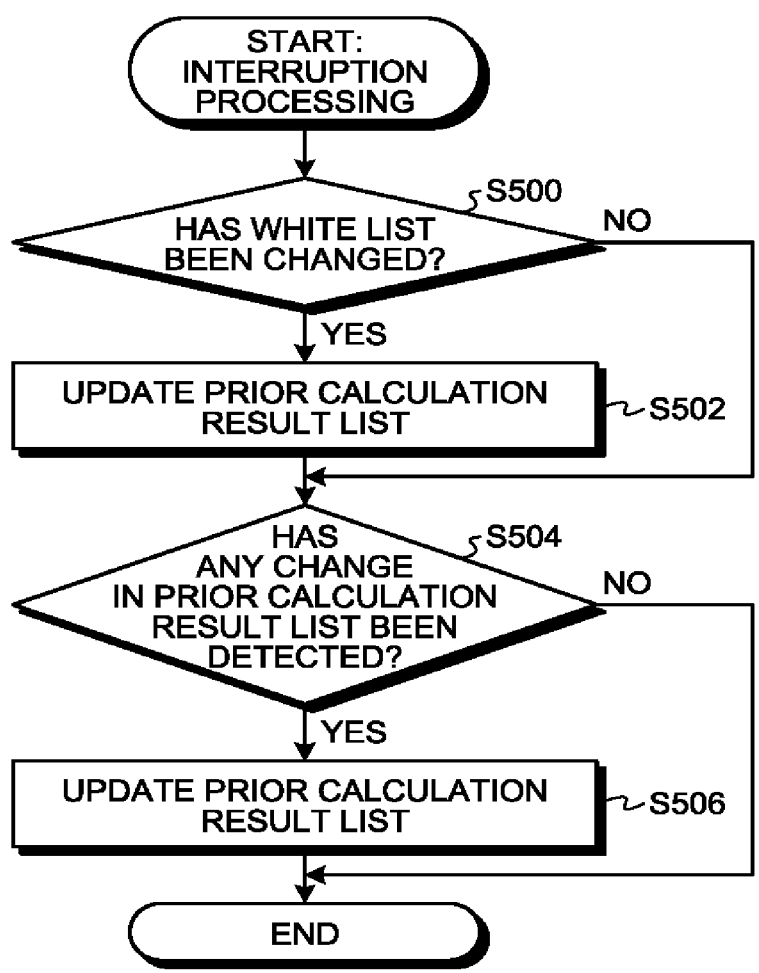
FIG. 13 is a flowchart illustrating a process of interruption processing.

FIG. 13 is a flowchart illustrating an example of a process of interruption processing executed with the information processing apparatus 10E.

First, the white list monitor 35P determines whether the white list 14A has been changed (Step S500). When affirmative determination is made at Step S500 (Yes at Step S500), the process proceeds to Step S502.

At Step S502, the white list monitor 35P updates the prior calculation result list 15A (Step S502). Thereafter, the process proceeds to Step S504. By contrast, also when negative determination is made at Step S500 (No at Step S500), the process proceeds to Step S504.

At Step S504, the prior calculation result monitor 35Q determines whether any change in information relating to the prior calculation result list 15A has been detected (Step S504). When negative determination is made at Step S504 (No at Step S504), the present routine is finished. When affirmative determination is made at Step S504 (Yes at Step S504), the process proceeds to Step S506.

At Step S506, the prior calculation result monitor 35Q updates the corresponding portion in the prior calculation result list 15A (Step S506). Thereafter, the present routine is finished.

As explained above, in the present embodiment, when the white list 14A has been changed, the white list monitor 35P updates information corresponding to the change in the prior calculation result list 15A. In addition, when information relating to the prior calculation result list 15A has been changed, the prior calculation result monitor 35Q updates the corresponding portion in the prior calculation result list 15A.

With this structure, the information processing apparatus 10E according to the present embodiment is enabled to suppress defectiveness caused by change in the contents of the white list 14A and/or the prior calculation result list 15A, in addition to the advantageous effects of the first embodiment described above.

In the case of the structure without the white list monitor 35P and the prior calculation result monitor 35Q, there are cases where defectiveness occurs, when the information relating to the checksum is changed during the time from registration of the related identifier and the checksum in the prior calculation result list 15A to specification of the checksum with the specifier 30D. For example, the program (also including the related program) may be changed, directly after the storage processor 30H associates the related identifier with the checksum and registers them in the prior calculation result list 15A. In this case, the program and the checksum of the program have values different from those before change.

In this case, a difference is generated between the checksum calculated with the checksum calculator 30C and the checksum specified with the specifier 30D using the same program identifier. In this case, this causes defectiveness in the verification result obtained with the verifier 30E.

In addition, when the white list 14A is changed, a difference is generated between the related identifier and the calculation result (checksum and index) registered in the prior calculation result list 15A and the program identifier indicating the related identifier in the white list 14A and the checksum thereof. This may cause decrease in verification accuracy for the program using the white list 14A.

By contrast, in the present embodiment, when the white list 14A has been changed, the white list monitor 35P updates information corresponding to the change in the prior calculation result list 15A. In addition, when information relating to the prior calculation result list 15A has been changed, the prior calculation result monitor 35Q updates the corresponding portion in the prior calculation result list 15A.

With this structure, the information processing apparatus 10E according to the present embodiment is enabled to suppress occurrence of defectiveness caused by change in the contents of the white list 14A and/or the prior calculation result list 15A, in addition to the advantageous effects of the first embodiment described above.

The present embodiment illustrates the structure in which the processing unit 12E includes both the white list monitor 35P and the prior calculation result monitor 35Q. However, it suffices that the processing unit 12E is configured to further include at least one of the white list monitor 35P and the prior calculation result monitor 35Q. For this reason, the processing unit 12E may include only one of the white list monitor 35P and the prior calculation result monitor 35Q.

The white list monitor 35P and the prior calculation result monitor 35Q may mutually refer to the contents of the white list 14A and the prior calculation result list 15A, to check consistency of them.

The function other than the white list monitor 35P and the prior calculation result monitor 35Q may further include the function to suppress defectiveness.

For example, the determiner 30B may determine that calculation of the checksum is always required, with a fixed probability, even when the acquired program identifier is registered in the prior calculation result list 15A.

The storage processor 30H may associate the time information, the related identifier, and the checksum with each other, and register them in the prior calculation result list 15A. In addition, the storage processor 30H searches for a related identifier, for which a predetermined period or more has passed, in the prior calculation result list 15A using the time information. The storage processor 30H may delete the retrieved related identifier, and the time information and the checksum corresponding to the related identifier from the prior calculation result list 15A.

In addition, the storage processor 30H may refer to the related identifiers stored in the prior calculation result list 15A for each certain period, perform control to recalculate the checksum by controlling the checksum calculator 30C, and register the recalculated value by overwrite in the prior calculation result list 15A.

Sixth Embodiment

In the embodiments described above, processing (prior calculation) of the estimator and the following units is executed after the acquirer acquires a program identifier for identifying the computer program serving as the execution target, that is, for example, when the computer program serving as the execution target is started. However, the timing at which prior calculation is executed is not limited thereto. The present embodiment illustrates an example in which prior calculation is executed when a specific event occurs.

In the present embodiment, the same structures and the same functions as those in the embodiments and the modification described above are denoted with the same reference numerals, and a detailed explanation thereof is omitted. In the present embodiment, the same words are used for terms indicating the same definitions as those in the embodiments and the modification described above, and a detailed explanation thereof is omitted.

FIG. 1 is a schematic diagram illustrating an example of an information processing system 1F according to the present embodiment.

The information processing system 1F includes an information processing apparatus 10F and the processing device 20. The information processing apparatus 10F and the processing device 20 are connected with each other through a wired line or wireless line such that they are capable of transmitting and receiving data and/or signals to and from each other. The processing device 20 is the same as that in the first embodiment. The information processing apparatus 10F includes a processing unit 12F and the white list storage 14.

Figure 14:
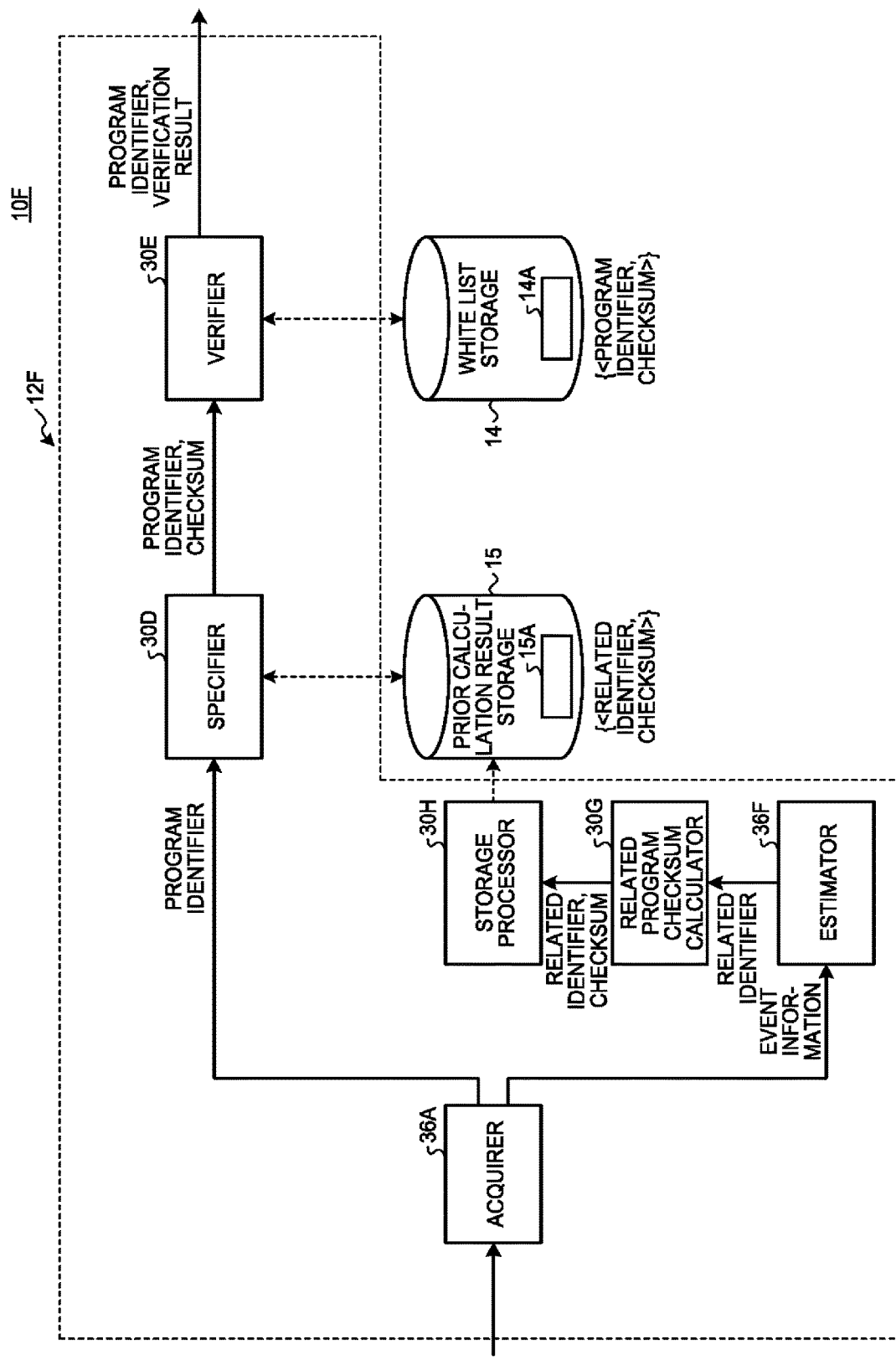
FIG. 14 is a block diagram illustrating a functional configuration of the information processing apparatus.

The following is an explanation of the information processing apparatus 10F. FIG. 14 is a block diagram illustrating an example of a functional configuration of the information processing apparatus 10F according to the present embodiment.

The information processing apparatus 10F includes the processing unit 12F, the white list storage 14, and the prior calculation result storage 15. The processing unit 12F is connected with the prior calculation result storage 15 and the white list storage 14 such that they are capable of transmitting and receiving data and/or signals to and from each other. The white list storage 14 and the prior calculation result storage 15 are the same as those in the first embodiment.

The processing unit 12F includes an acquirer 36A, the specifier 30D, the verifier 30E, an estimator 36F, the related program checksum calculator 30G, and the storage processor 30H. The processing unit 12F is different from the processing unit 12 according to the first embodiment, in that the determiner 30B and the checksum calculator 30C are removed and in functions of the acquirer 36A and the estimator 36F. The other structures thereof are the same as those of the processing unit 12 according to the first embodiment.

The acquirer 36A is different from the acquirer 30A according to the first embodiment in that the acquirer 36A also detects a predetermined specific event and outputs event information indicating the detected event. The acquirer 36A may be divided into the acquirer 30A according to the first embodiment and a structural unit (event detector) having an event detecting function added in the present embodiment.

The acquirer 36A detects occurrence of a specific event, and outputs event information indicating details of the detected event and the like to the estimator 36F. The specific event is, for example, issuance of a specific system call, reduction in load of the computer to a certain rate or less, change in state of the processor to a state of waiting for device input, and change in state of a specific task (computer program) to a state of waiting for device input.

The specific system call is, for example, a system call assigning an identifier to a related program, and a system call to execute a related program, and the like. The system call assigning an identifier to a related program is, for example, a system call to open a file, generate a shared memory, open the shared memory, and assign an identifier to a specific area on the memory.

As described above, the specific event is, for example, an event related to a related program, but may be an event related to a specific program (computer program identified with a specific program identifier). For example, the acquirer 36A may detect issuance of a system call to execute a specific program, as a specific event. In this case, the acquirer 36A outputs event information including a program identifier of the specific program to the estimator 36F, and also outputs the program identifier of the specific program to the specifier 30D. The specifier 30D executes the processing described above using the program identifier input from the acquirer 36A.

The acquirer 36A may determine whether the identifier corresponding to the detected event is a program identifier of a specific program or a program identifier (related identifier) of a related program, for example, according to the type of the detected event.

When an event is detected and the acquirer 36A can acquire a related identifier (or program identifier) of the related program (or specific program) corresponding to the event, the acquirer 36A outputs event information including the acquired related identifier (or program identifier). For example, when a system call assigning an identifier to a specific memory area is detected as an event, the acquirer 36A acquires a unique number (identifier) assigned to the memory area, as the related identifier (or program identifier).

When no related identifier (program identifier) can be acquired, the acquirer 36A outputs event information including information for acquiring (estimating) the related identifier (program identifier). For example, the acquirer 36A may output, as the event information, system call argument information including information enabling estimation of the related identifier (program identifier) of the related program (specific program), such as a path of the related program (specific program).

The estimator 36F estimates a related program on the basis of the event information. For example, when the event information includes a related identifier, the estimator 36F estimates a computer program identified with the related identifier included in the event information as the related program. When the event information includes a program identifier of a specific program, the estimator 36F estimates a related program related to the computer program identified with the program identifier by the method similar to that of the first embodiment.

When the acquirer 36A cannot directly acquire a related identifier (program identifier), the estimator 36F may estimate a related identifier (program identifier) from the event information received from the acquirer 36A. For example, the estimator 36F may estimate a related identifier of a related program from a path included in the system call argument information.

When the estimator 36F receives event information including a related identifier from the acquirer 36A, the estimator 36F outputs the related identifier included in the event information to the related program checksum calculator 30G. When the estimator 36F receives event information including a program identifier of a specific program from the acquirer 36A, the estimator 36F estimates a related program related to the computer program identified with the received program identifier by the same method as that of the first embodiment. Thereafter, the estimator 36F outputs the related identifier of the estimated related program to the related program checksum calculator 30G.

When the event is reduction in load of the computer to a certain rate or less, change in state of the processor to a state of waiting for device input, and the like, there are cases where the event is not directly related to the specific program (task). In such a case, the estimator 36F may estimate a related program by the same method as that of the first embodiment, for example, for computer programs not subjected to related program estimation processing among computer programs being executed.

The processing load of the information processing apparatus 10 can be distributed and the time for calculating the checksum in execution of the computer program can be shortened by executing prior calculation with an event serving as a trigger, such as reduction in load of the computer to a certain rate or less and change in state of the processor to a state of waiting for device input.

When the acquirer 36A acquires a unique number (identifier) assigned to the memory area as a related identifier, the related program checksum calculator 30G is required to acquire actual data of the memory area indicated with the unique number for calculation of the checksum. For this reason, the estimator 36F acquires data stored in the memory area on the basis of the unique number, and outputs the acquired data together with the unique number to the related program checksum calculator 30G.

In the case where a specific event always occurs before a certain computer program is executed, when the specific event is detected, the checksum can be calculated in advance with the computer program serving as the related program and registered in the prior calculation result list 15A. This structure removes the necessity to determine with the determiner 30B whether any checksum corresponding to the related identifier is registered in the prior calculation result list 15A, as determined in the first embodiment. For this reason, the present embodiment is configured to include no determiner 30B or checksum calculator 30C.

For example, in the case where there is the possibility that the checksum cannot be calculated in advance, the structure may include the determiner 30B and the checksum calculator 30C, in the same manner as the first embodiment.

Figure 15:
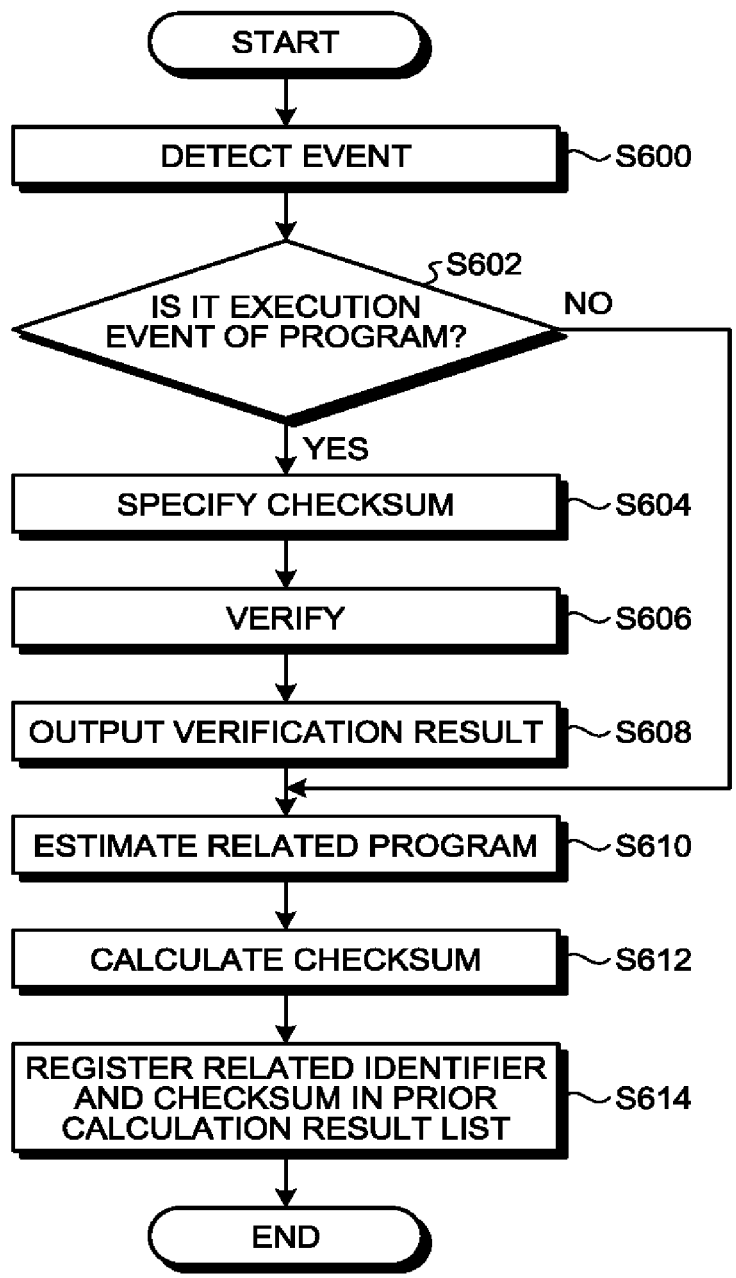
FIG. 15 is a flowchart illustrating an example of a process of information processing.

The following is an explanation of an example of a process of information processing executed with the information processing apparatus 10F according to the present embodiment. FIG. 15 is a flowchart illustrating an example of a process of information processing executed with the information processing apparatus 10F according to the present embodiment. The flowchart illustrated in FIG. 15 is an example of a detailed explanation of the processing at Step S7 and Step S8 and the processing at Step S21 and Step S22 illustrated in FIG. 2.

First, the acquirer 36A detects an event, and outputs event information indicating the detected event (Step S600). The acquirer 36A determines whether the detected event is an event (execution event) indicating execution of a specific program (Step S602).

When the detected event is an execution event of a specific program (Yes at Step S602), the specifier 30D receives the program identifier identifying the computer program serving as the execution target from the acquirer 36A, and reads a checksum corresponding to the related identifier indicating the received program identifier from the prior calculation result list 15A. In this manner, the specifier 30D specifies the checksum corresponding to the received program identifier (Step S604).

Thereafter, the verifier 30E verifies whether the computer program identified with the program identifier is permitted to be executed using the checksum specified at Step S604, the program identifier output from the specifier 30D, and the white list 14A (Step S606). Thereafter, the verifier 30E outputs a verification result indicating that the computer program is permitted or not permitted to be executed to the processing device 20 (Step S608).

When the event detected at Step S602 is not an execution event of a specific program (No at Step S602) and after execution of Step S608, the estimator 36F estimates the related program (related identifier) from the event information (Step S610).

When the event information includes a program identifier of a specific program, the estimator 36F estimates the related program related to the computer program identified with the program identifier by the same method as that in the first embodiment. When the event information includes a related identifier of a related program, the estimator 36F can output the related identifier without any processing to the related program checksum calculator 30G. When the event information includes information to estimate a related identifier, the estimator 36F estimates the related identifier from the information, and outputs the estimated related identifier to the related program checksum calculator 30G.

Thereafter, the related program checksum calculator 30G calculates the checksum of the related program estimated at Step S610 (Step S612). Thereafter, the storage processor 30H associates the related identifier of the related program estimated at Step S610 with the checksum calculated for the related program at Step S612, and registers them in the prior calculation result list 15A (Step S614). Thereafter, the present routine is ended.

For example, file-less malware is executed without going through a file system by the following process:

Dispose an execution image of the computer program on the memory;

Assign an identifier to the execution image; and

Transfer the assigned identifier to the system call to execute the process.

The present embodiment enables capturing of a system call serving as an execution trigger of the execution image disposed on the memory, against computer programs (execution images) executed by such a process, and verification of the checksum of the execution image disposed on the memory using a white list. Specifically, the present embodiment enables more accurate verification processing using a white list. In the present embodiment, execution of execution images on the memory is not rejected all together, but permitted execution images on the memory are allowed to be executed. Specifically, the present embodiment prevents rejection of execution of a normal computer program of a type of executing execution images on the memory.

Figure 16:
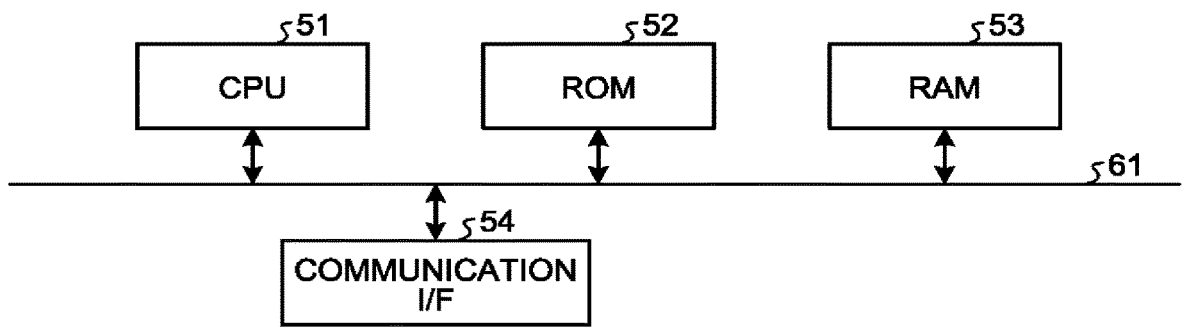
FIG. 16 is a hardware configuration diagram of the information processing apparatus.

The following is an explanation of an example of the information processing apparatuses 10, 10A, 10B, 10C, 10D, 10E, and 10F according to the embodiments and the modification described above. FIG. 16 is an example of a hardware configuration diagram of the information processing apparatuses 10, 10A, 10B, 10C, 10D, 10E, and 10F according to the embodiments and the modification described above.

Each of the information processing apparatuses 10, 10A, 10B, 10C, 10D, 10E, and 10F according to the embodiments and the modification described above has a hardware configuration using an ordinary computer, and including a control device such as a CPU 51, a storage device, such as a read only memory (ROM) 52, a RAM 53, and a hard disk drive (HDD), a communication I/F unit 54 serving as an interface with various devices, and a bus 61 connecting the units.

In each of the information processing apparatuses 10, 10A, 10B, 10C, 10D, 10E, and 10F according to the embodiments and the modification described above, the CPU 51 reads a computer program from the ROM 52 onto the RAM 53 and executes the program to achieve each of the functions described above on the computer.

The HDD may store therein the programs to execute each of the processes described above executed with each of the information processing apparatuses 10, 10A, 10B, 10C, 10D, 10E, and 10F according to the embodiments and the modification described above. The program to execute each of the processes described above executed with each of the information processing apparatuses 10, 10A, 10B, 10C, 10D, 10E, and 10F according to the embodiments and the modification described above may be incorporated in advance in the ROM 52 to be provided.

In addition, the program to execute the processes described above executed with each of the information processing apparatuses 10, 10A, 10B, 10C, 10D, 10E, and 10F according to the embodiments and the modification described above may be stored as a file in an installable form or an permitted to be executed form in a computer-readable storage medium, such as a CD-ROM, a CD-R, a memory card, a digital versatile disc (DVD), and a flexible disk (FD), and provided as a computer program product. As another example, the program to execute the processes described above executed with each of the information processing apparatuses 10, 10A, 10B, 10C, 10D, 10E, and 10F according to the embodiments and the modification described above may be stored in a computer connected to a network, such as the Internet, and provided by download through a network. As another example, the program to execute the processes described above executed with each of the information processing apparatuses 10, 10A, 10B, 10C, 10D, 10E, and 10F according to the embodiments and the modification described above may be provided or distributed through a network, such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   one or more hardware processors configured to:
   verify whether a first program identifier for identifying a first program serving as an operation target and a first calculation result corresponding to the first program identifier are registered in a white list;
   when the first program identifier and the first calculation result are registered in the white list, verify whether a second program identifier for identifying a second program related to the first program and a second calculation result corresponding to the second program identifier are registered in the white list; and
   when the first program identifier and the first calculation result are registered in the white list and the second program identifier and the second calculation result are registered in the white list, perform an operation with respect to the first program, wherein
   the second program includes at least one of an program that is stored in a same storage area as that of the first program, an program that is executed together when the first program is executed, and an program that is executed by an application executing the first program, and
   the first program is a program disposed on a memory without being disposed on a file system.

2. The information processing apparatus according to claim 1, wherein the hardware processors are configured to:
   previously prepare the second calculation result;
   register the previously prepared second calculation result and the second program identifier in a prior calculation result list, the second calculation result and the second program identifier being associated with each other; and
   read out the second calculation result corresponding to the second program identifier from the prior calculation result list and verify whether the read second calculation result and the second program identifier are registered in the white list.

3. The information processing apparatus according to claim 2, wherein the hardware processors are configured to:
   detect a predetermined event and output event information indicating the detected event, and prepare the second calculation result on the basis of the event information.

4. The information processing apparatus according to claim 3, wherein the predetermined event includes at least one of an event assigning the second program identifier to the second program and an event to execute the second program.

5. The information processing apparatus according to claim 2, wherein the second calculation result is at least one of a checksum of the second program and an index indicating a registration position of the second program identifier in the white list.

6. The information processing apparatus according to claim 2, wherein the hardware processors are configured to:
   calculate the second calculation result, when the second calculation result is not registered in the prior calculation result list,
   when the second calculation result is registered in the prior calculation result list, verify whether the registered second calculation result and the second program identifier are registered in the white list; and
   when the second calculation result is not registered in the prior calculation result list, verify whether the calculated second calculation result and the second program identifier are in the white list.

7. The information processing apparatus according to claim 2, wherein
   the second calculation result is a checksum of the second program, and
   the hardware processors are configured to derive a verification result indicating whether the second program identifier and the checksum corresponding to the second program identifier in the prior calculation result list are registered in association with each other in the white list.

8. The information processing apparatus according to claim 2, wherein the second calculation result is an index indicating a registration position of the second program identifier in the white list, and the hardware processors are configured to verify whether the second program identifier and the index corresponding to the second program identifier in the prior calculation result list are registered in the white list.

9. The information processing apparatus according to claim 2, wherein a plurality of the second program identifiers registered in the prior calculation result list are smaller in number than a plurality of the program identifiers registered in the white list; and the hardware processors are configured to:

verify whether the second program identifier and the second calculation result are registered in the prior calculation result list, when the second program identifier is registered in the prior calculation result list; and verify whether the second program identifier and the second calculation result are registered in the white list, when the second program identifier is not registered in the prior calculation result list.

10. The information processing apparatus according to claim 2, wherein the hardware processors are configured to estimate the second program related to the first program acquired as the operation target.

11. The information processing apparatus according to claim 2, wherein the hardware processors are configured to estimate the second program related to the first program that is a program verified previously.

12. The information processing apparatus according to claim 2, wherein the hardware processors are configured to estimate the second program related to the first program identified with the first program identifier from a related program list associating the first program identifier with the second program identifier.

13. The information processing apparatus according to claim 12, the hardware processors are configured to update the related program list on the basis of a verification result.

14. The information processing apparatus according to claim 2, wherein the hardware processors are configured to;

monitor change of the white list, and update information corresponding to the change in the prior calculation result list when the white list is changed.

15. The information processing apparatus according to claim 2, wherein the hardware processors are configured to:

monitor change of information relating to the prior calculation result list, and update a corresponding part in the prior calculation result list when the information relating to the prior calculation result list is changed.

16. An information processing method comprising:

verifying whether a first program identifier for identifying a first program serving as an operation target and a first calculation result corresponding to the first program identifier are registered in a white list;

when the first program identifier and the first calculation result are registered in the white list, verifying whether a second program identifier for identifying a second program related to the first program and a second calculation result corresponding to the second program identifier are registered in the white list; and when the first program identifier and the first calculation result are registered in the white list and the second program identifier and the second calculation result are registered in the white list, performing an operation with respect to the first program, wherein the second program includes at least one of an program that is stored in a same storage area as that of the first program, an program that is executed together when the first program is executed, and an program that is executed by an application executing the first program, and the first program is a program disposed on a memory without being disposed on a file system.

17. A computer program product comprising a non-transitory computer-readable medium including programmed instructions, the instructions, the instructions causing a computer to execute:

verifying whether a first program identifier for identifying a first program serving as an operation target and a first calculation result corresponding to the first program identifier are registered in a white list;

when the first program identifier and the first calculation result are registered in the white list, verifying whether a second program identifier for identifying a second program related to the first program and a second calculation result corresponding to the second program identifier are registered in the white list; and when the first program identifier and the first calculation result are registered in the white list and the second program identifier and the second calculation result are registered in the white list, performing an operation with respect to the first program, wherein the second program includes at least one of an program that is stored in a same storage area as that of the first program, an program that is executed together when the first program is executed, and an program that is executed by an application executing the first program, and the first program is a program disposed on a memory without being disposed on a file system.

* * * * *